(12) United States Patent
Jin et al.

(10) Patent No.: US 6,297,189 B1
(45) Date of Patent: Oct. 2, 2001

(54) SULFIDE CATALYSTS FOR REDUCING SO$^2$ TO ELEMENTAL SULFUR

(75) Inventors: Yun Jin; Qiquan Yu, both of Peking (CN); Shih-Ger Chang, El Cerrito, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/006,702

(22) Filed: Jan. 14, 1998

(51) Int. Cl.[7] .................... B01J 27/055; B01J 27/051; B01J 27/049; B01J 8/02; B01J 8/00
(52) U.S. Cl. .................... 502/218; 502/219; 502/220; 502/221; 423/213.2; 423/213.5; 423/230; 423/242.1; 423/244.02; 423/244.06; 433/244.07
(58) Field of Search ........................ 502/216, 218, 502/219, 220, 221, 302, 303, 304, 305, 313, 314, 315, 316, 321, 324, 325, 326, 328, 330, 331, 337, 338, 340, 344, 345, 349, 353; 423/212, 213.2, 213.5, 230, 242.1, 244.01, 244.02, 244.06, 244.07

(56) References Cited

U.S. PATENT DOCUMENTS

| | | | |
|---|---|---|---|
| 3,864,459 | * 2/1975 | Stiles | 423/564 |
| 3,965,041 | * 6/1976 | Van Klinken et al. | 252/437 |
| 4,491,639 | * 1/1985 | Happel et al. | 502/219 |
| 4,626,339 | * 12/1986 | Chianelli et al. | 208/18 |
| 4,748,141 | * 5/1988 | Baker | 502/216 |
| 4,748,142 | * 5/1988 | Chianelli et al. | 502/220 |
| 4,825,013 | * 4/1989 | Quarderer et al. | 568/902.2 |
| 4,831,060 | * 5/1989 | Stevens et al. | 518/714 |
| 4,839,326 | * 6/1989 | Halbert et al. | 502/220 |
| 4,882,360 | * 11/1989 | Stevens | 518/714 |
| 4,902,404 | * 2/1990 | Ho | 208/57 |
| 5,494,879 | * 2/1996 | Jin et al. | 502/314 |
| 5,795,554 | * 8/1998 | Fang et al. | 423/263 |

* cited by examiner

Primary Examiner—Tom Dunn
Assistant Examiner—Cam N. Nguyen
(74) Attorney, Agent, or Firm—Henry P. Sartorio

(57) ABSTRACT

A highly efficient sulfide catalyst for reducing sulfur dioxide to elemental sulfur, which maximizes the selectivity of elemental sulfur over byproducts and has a high conversion efficiency. Various feed stream contaminants, such as water vapor are well tolerated. Additionally, hydrogen, carbon monoxide, or hydrogen sulfides can be employed as the reducing gases while maintaining high conversion efficiency. This allows a much wider range of uses and higher level of feed stream contaminants than prior art catalysts.

12 Claims, 19 Drawing Sheets

SULFIDE CATALYSTS FOR REDUCING SO² TO ELEMENTAL SULFUR

This invention was made with Government support under Contract No. DE-ACO3-76SF00098 between the U.S. Department of Energy and the University of California for the operation of Lawrence Berkeley National Laboratory. The Government has certain rights in this invention.

BACKGROUND OF THE INVENTION

This invention relates to catalysts which can convert sulfur dioxide to elemental sulfur, and the preparation method needed for their manufacture.

Industries Generating $SO_2$

A chronic concern for the environment has been release of pollution from industrial and other sources into the air and water. Of particular concern to environmentalist are gaseous emission containing sulfur dioxide. When this gas rises to cloud level, the rain produced from these clouds can become highly acidic, at times reaching the acid levels of vinegar. Because the emissions and clouds effected by them can travel great distances beyond the point of initial emission, this form of pollution takes on international dimensions.

The effects of such industrially related acid rains are infamous. Streams and lakes in North Eastern America and Canada have been rendered devoid of their natural flora and fauna due to acidification by acid rain. Trees in these areas have also been baldly compromised. Similar effects have been seen in Europe, where large section of trees in the famous Black Forest have been damaged, and in some cases destroyed, by the effects of acid rain.

Flue gases emitted from burning sulfur-containing fossil fuels are the most common source of dilute sulfur dioxide ($So_2$) containing industrial gases. Sulfur dioxide is the unwanted byproduct of a diverse array of industrial activities, such as coal-burning power plants, advanced integrated gasification combined cycle (IGCC) using hot gas clean up systems, petroleum sulfur plants tail gas treatment facilities, metallurgical operations, and the like. Because of regulatory constraints, these operations are currently hampered by a limited choice of available coal sources, working parameters, etc., in order to meet environmental regulatory mandates. Further reduction of $SO_2$ contaminates would allow longer operating times for these facilities while staying within the legally determined limits for emissions.

Regenerable flue gas desulfurization systems (FGD) and integrated gasification combined cycle (IGCC) hot gas cleanup systems have been developed for use in coal-based utility industries. These systems release a stream of highly concentration (1%–30%) $SO_2$ gas. It is desirable to be able to convert the $SO_2$ gas to elemental sulfur using a single step process.

The petrochemical industry commonly uses the conventional Claus process for conversion of $H_2S$ to elemental sulfur. This system releases a stream of tail gas containing $SO_2$ and $H_2S$. An additional tail gas treatment system is then required to reduce these residual gases to below 250 ppm in order to comply with environmental air regulations. Currently available tail gas treatment systems requiring an organic solvent absorption step are complex and expensive. The development of a new tail gas treatment process capable of reducing $SO_2$ by $H_2$/CO to elemental sulfur would be very desirable and cost effective.

Conversion of $SO_2$ to Elemental Sulfur

Research efforts have been made to allow the conversion of sulfur dioxide to elemental sulfur. In these methods, sulfur dioxide is reduced with synthesis or natural gases. Synthesis gases are derived from coal ($H_2$/CO=0.3–2.0) or methane ($H_2$/CO=3–5). At elevated temperatures, sulfur dioxide can be converted to elemental sulfur through the following reactions:

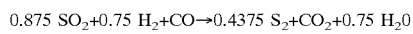

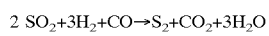

Sulfur dioxide can be reduced with natural gas (mainly methane) as follows:

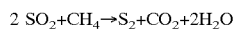

The reactions must be facilitated with catalysts in order to achieve a real time high conversion efficiency of $SO_2$. Even with the assistance of numerous catalysts, commercially feasible conversion efficiencies have not been achieved.

In addition to elemental sulfur, the above reactions produce a number of undesirable byproducts. These can include hydrogen sulfide, carbonyl sulfide, carbon disulfide, and elemental carbon. These byproducts complicate the ability of the conversion reactions to effectively reduce the net airborne contaminates produced during industrial processing.

Because of the inadequacies of the above reactions when direct to industrial applications, research efforts have been carried out to bring this potentially useful area of technology to a level where it has practical applications. The thrust of these research efforts have been to improve the conversion efficiency of sulfur dioxide and increase the selectivity to the production of elemental sulfur at relatively low temperatures.

While there has been some success in this area of research, the results which have been reported to date can not practically be applied to commercial uses.

Oxide and Metal Catalysts

Responding to the problems of current $SO_2$ capture methods, the catalyst research community has been attempting to develop regenerable flue gas desulfurization catalysts and processes. Most of the efforts to develop a practical $SO_2$ reductant catalyst have not progressed beyond basic research. However, recently certain researchers have reported more success.

Oxide and simple metal forms of metals represent the few $SO_2$ catalysts with appreciable activity. Many challenges have been encountered in this area of research, such as low yields, substantial reduction of sulfur yields by very low levels of water vapor, and unacceptable levels of unwanted byproducts.

By using syngas to reduce $SO_2$, Akhmedov et. al. (*Azerb Khim. Zh*(2), 95–9, 1983) developed several catalysts and obtained the following results: a 64–65% sulfur yield with a bauxite-bentonite catalyst at 350° C. with a feed gas at a molar ratio (CO+$H_2$)/$SO_2$ of 2 and a space velocity of 1000 $h^{-1}$; a 82% sulfur yield with a NiO/$Al_2O_3$ catalyst at 300° C. with a space velocity of 500 $h^{-1}$ (*Zh. Prikl., Khim.*, 61(1), 16–20, 1988); an 82% and 87.4% sulfur yield with a $Co_3O_4$/$Al_2O_3$ catalyst (*Zh. Prikl. Khim.*, 61(8), 1891–4, 1988) at 300° C. with a space velocity of 1000 $h^{-1}$ and 500 $h^{-1}$ respectively; a 82.3% and 78.6% sulfur yield with a NiO+$Co_3O_4$ catalyst (*Khim. Prom.* 1, 37–9, 1989) at 400° C. with a space velocity of 500 $h^{-1}$ and 1000 $h^{-1}$ respectively. The development of a catalyst capable of obtaining better than 90% yield of sulfur with a high space velocity at low temperatures would be required to warrant a commercial application.

Natural gas or methane can also be used as reducing gases to recover elemental sulfur from $SO_2$. However, this process requires elevated temperatures, and typically produces undesirable byproducts such as hydrogen sulfide, carbonyl sulfide, carbon monoxide, and elemental carbon. A plant capable of producing 5 tons per day of elemental sulfur through the reduction of $SO_2$ by natural gas was developed and in operation in 1940 (Fleming et al, *Industrial Enaineering Chemistry* Vol. 42, p2249, 1950). Because a secondary reactor was required to treat byproducts, this process was economically unattractive.

A more efficient process requiring two stages was developed to avoid some of the problems of the Fleming system. In the first step, part of the $SO_2$ was reduced to $H_2S$ by methane and/or low value hydrocarbons. In the second step, the $H_2S$ and the remaining $SO_2$ were converted to elemental sulfur in a multi-stage Claus unit (Bierbowere, et al *Chemical Engineering Progress* August, 1974).

Numerous research efforts have been made to develop a catalyst for sulfur dioxide reduction where the amount of byproducts produced is negligible, so that a second stage treatment will not be required. To date, none have been successful enough to warrant application to an industrial facility.

Flytzani-Stephanopoulos et al reported favorable results with mixed oxide catalysts in a limited environment, but rapidly decreasing sulfur yields in the presence of only one or two percent of water in the feed stream. In U.S. Pat. No. 5,242,673 (issued Sep. 7, 1993) Flytzani-Stephanopoulos et al taught a cerium oxide catalyst which, in a dry environment with CO in stolchiometeric amounts had better than 90% conversion rate (column 8, line 53–55), and in another case, a selectivity of sulfur dioxide toward elemental sulfur of 50–60% (column 9, lines 15–17).

In U.S. Pat. No. 5,384,301, (issued Jan. 24, 1995) Flytzani-Stephanopoulos et al teach several new sulfur dioxide reducing oxide catalysts. $CeO_2(La)$ showed a 95% conversion of $SO_2$ to elemental sulfur in a CO gas stream. With the addition of transition metals to produce $Cu/CeI_2M$, $Cr/CeO_2$, and $Ni/CeO_2$, the same level of conversion to sulfur was obtained. However, with only 2% $H_2O$ in the gas stream, the conversion to sulfur dropped to 72%. These sulfur yields were also reflected in the $Cu_{0.15}Ce_{0.85}O_{1.85}$, $Cu_{0.026}Pr_{0.035}Ce_{0.65}O_{1.85}$, $Gd_2Zr_2O_7$, and $Cu_{0.15}(Gd_2Zr_2)_{0.850}6.1$ catalysts these researchers reported.

Sulfide Catalysts

Sulfide forms $SO_2$ reductant catalysts have not been pursued by the catalyst research community beyond some very limited initial work due to the discouraging findings. Khalafalla et al found that when the iron on an iron-alumina catalyst was transformed to FeS, there was a decrease in activity, and in some cases showed no activity at all (Khalafalla et al. *Journal of Catalysis* vol. 24, pp. 121–129, 1972). Correlation of sulfidation with unwanted byproduct formation has also been reported (Haas et al., *Journal of Catalvsis* vol. 29, pp 264–269, 1973). The present inventors have also developed sulfur dioxide reducing catalysts, as described in U.S. Pat. No. 5,494,879 issued Feb. 27, 1996 and incorporated by reference herein.

A comparison of the oxide and sulfide forms of $SO_2$ catalysts is shown in the Comparison Chart below. The poor performance of the sulfide forms have led researchers to pursue the oxide forms of the catalysts.

SINGLE METAL $SO_2$ CATALYSTS COMPARING YIELDS FOR OXIDE AND SULFIDE FORMS

| | $M_2*O_3/AL_2O_3$ | | | $M_2S_3 AL_2O_3$ | | |
|---|---|---|---|---|---|---|
| Cat | t (°C.) | Reductant | Y($S_2$) (%) | t (°C.) | Reductant | Y($S_2$) (%) |
| Cr*/$Al_2O_3$ | 400 | CO + $H_2$ | 52.0[2] | 370 | $H_2$ | 24.2[2] |
| Mo*/$Al_2O_3$ | 450 | $H_2$ | 62.8[1] | 370 | $H_2$ | 49.1[3] |
| Cu*/$Al_2O_3$ | 400 | CO + $H_2$ | 35[2]/370 | $H_2$ | 20.1[3] | |
| Co*/$Al_2O_3$ | 400 | CO + $H_2$ | 70[2] | 370 | $H_2$ | 60.9[3] |
| Ni*/$Al_2O_3$ | 450 | $H_2$ | 61.7[1] | 370 | $H_2$ | 58.6[3] |

*M = Cr, Mo, Cu, Co, N;
[1]Alkhazov et al Zh. Prinkl. Zh. (J. Appl. Chem.) (9) 1826–31 (1991) (Russ)
[2]M.M. Akhmedov et al Khim. Prom. (Chem. Ind.) [1] 37–9 (1989) (Russ)
[3]Paik et al, Appl. Catal. B8 267–79 (1996).

It would be highly desirable to convert the many sources of sulfur dioxide from the many industrial activities that produce it to elemental sulfur. If this conversion could be accomplished in a commercially feasible manner, it would allow reclamation of sulfur and its recycling as a valuable chemical.

BRIEF DESCRIPTION OF THE INVENTION

The present inventive preparation process and the resulting unique catalysts provide unprecedented advantages over prior art sulfur dioxide reductant catalysts. The sulfide form of metals in the inventive catalysts provide unique advantages such as high yield of sulfur and low unwanted byproducts. This allows a single step conversion of $SO_2$ gas from industrial sources to elemental sulfur by simultaneously feeding a gas stream containing $SO_2$ and a separate stream of reducing gas through the inventive catalytic reactor.

The present invention is based on the unexpected discovery of the inventors that performance parameters of their prior oxide $SO_2$ reducing catalysts were substantially improved upon by employing sulfidation as a step in the preparation protocol. In one embodiment of the inventive process, surface metallic oxide species are converted to their sulfide forms by treatment with gases containing sulfur components. Another approach to producing the improved catalysts of the present invention is to introduce the sulfur components in the form of a solution, such as ammonium sulfide, during their manufacture.

Using any number of previous catalytic formulations as a starting point, the inventive sulfidation step taught in the present application results in new catalysts with unprecedented high sulfur recovery rates. The inventive catalysts high efficiency remains even when hydrogen, carbon monoxide, or hydrogen sulfides are employed as the reducing gases.

Water vapor, a common poison of prior art catalysts, are well tolerated by the inventive catalyst, which shows no appreciable reduction in sulfur yields in their presence. The inventive catalysts work well at various pressures, and at a wide range of $SO_2$ concentrations (300 ppm to over 66.7%).

It is an object of the present invention to provide a sulfur dioxide reducing catalyst with a high conversion rate selectively to elemental sulfur.

It is another object of the invention to provide a sulfur dioxide reducing catalyst with a high conversion selectively to elemental sulfur that will be effective in coal burning power plants, advanced IGCC plants using hot gas treatment systems, petroleum sulfur tail gas treatment plants, and other industries which burn sulfur containing fuel or emit sulfur dioxide fumes.

It is yet another object of the present invention to provide an efficient sulfur dioxide reducing catalyst selective for elemental sulfur which can be operated in a wide range of temperatures and reducing gases, in the presence of water vapor, and at various pressures.

DETAILED DESCRIPTION OF THE INVENTION

Figure 1:
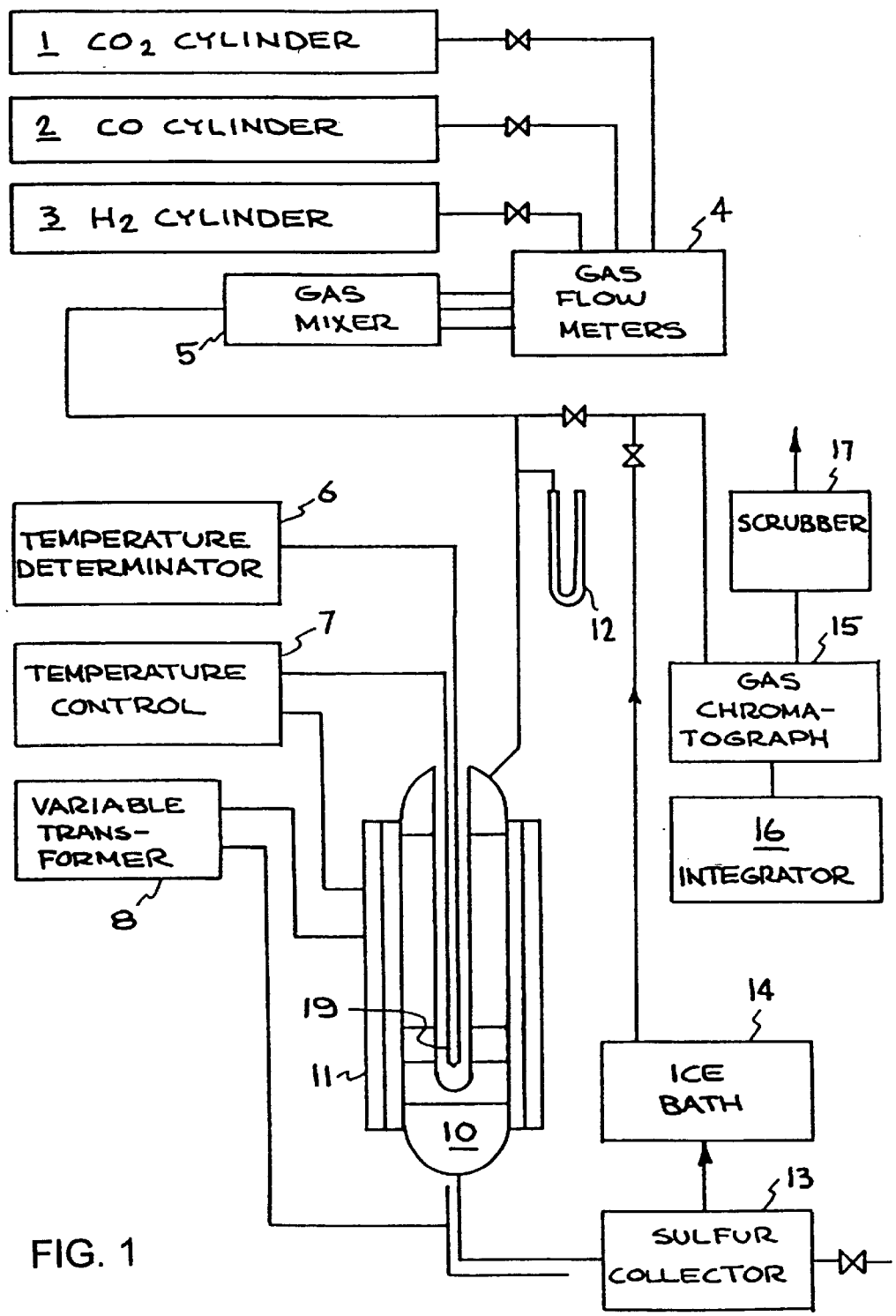
FIG. 1 is a schematic diagram of a testing apparatus.
Figure 2:
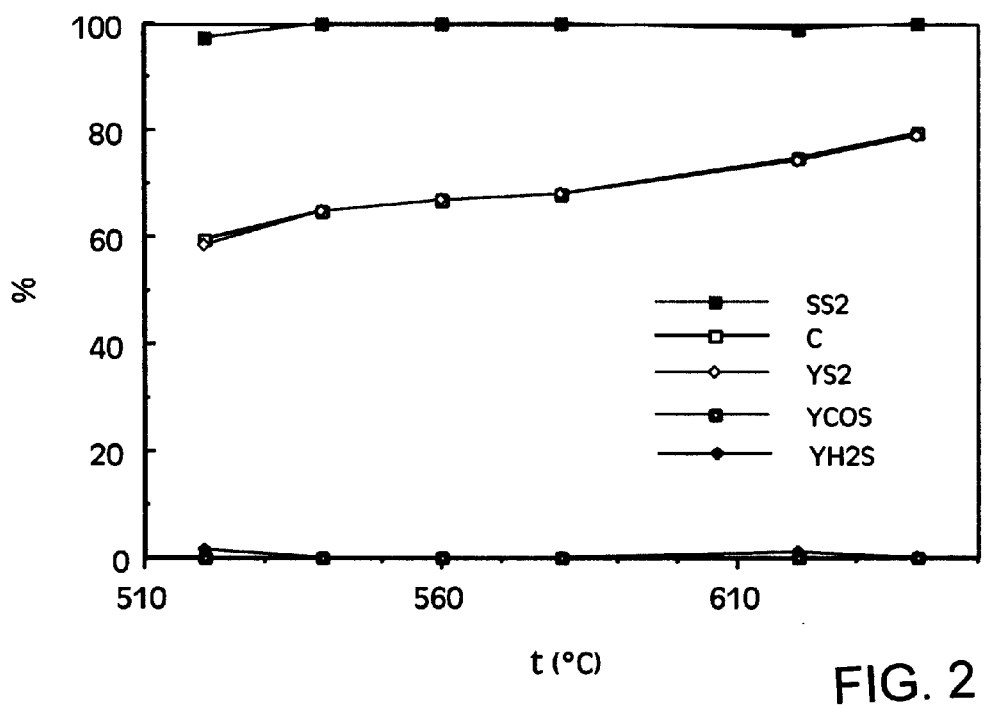
FIGS. 2–37 are Tables 1–29 which provide experimental results.
Figure 3:
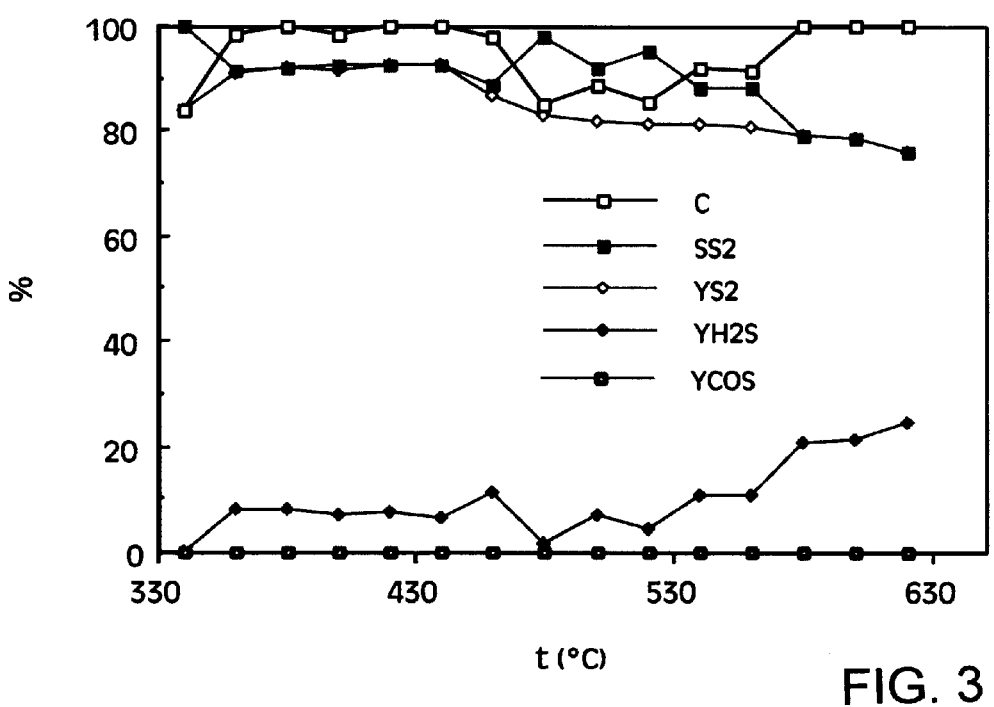
Figure 4:
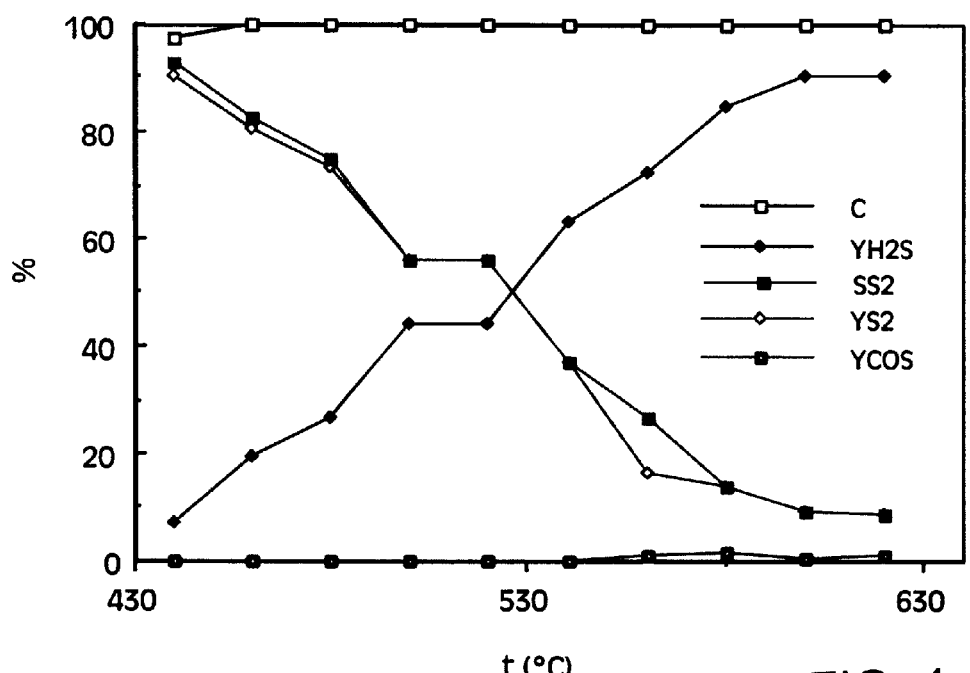
Figure 5:
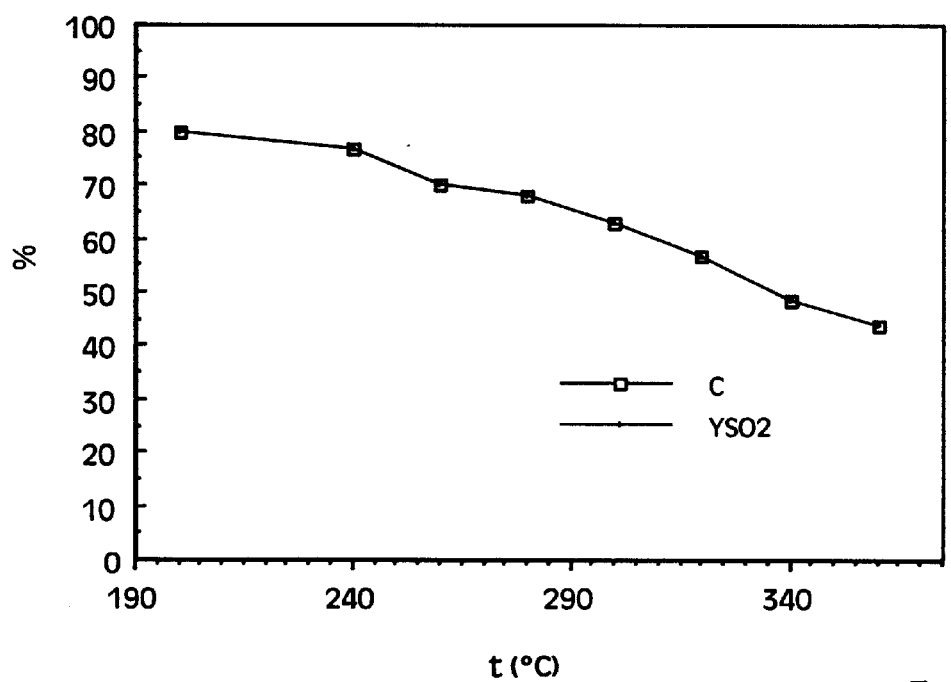
Figure 6:
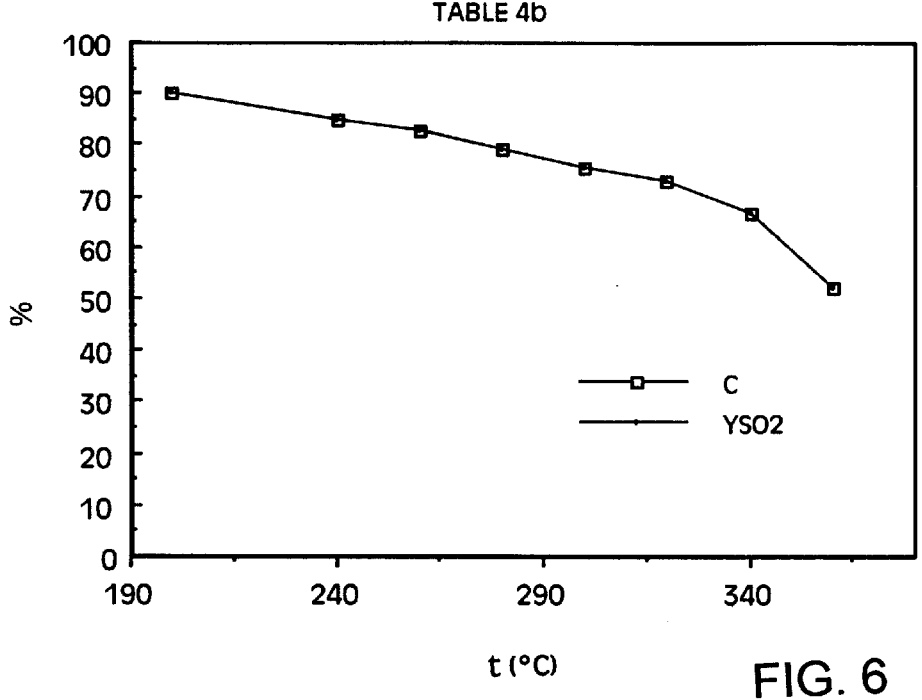
Figure 7:
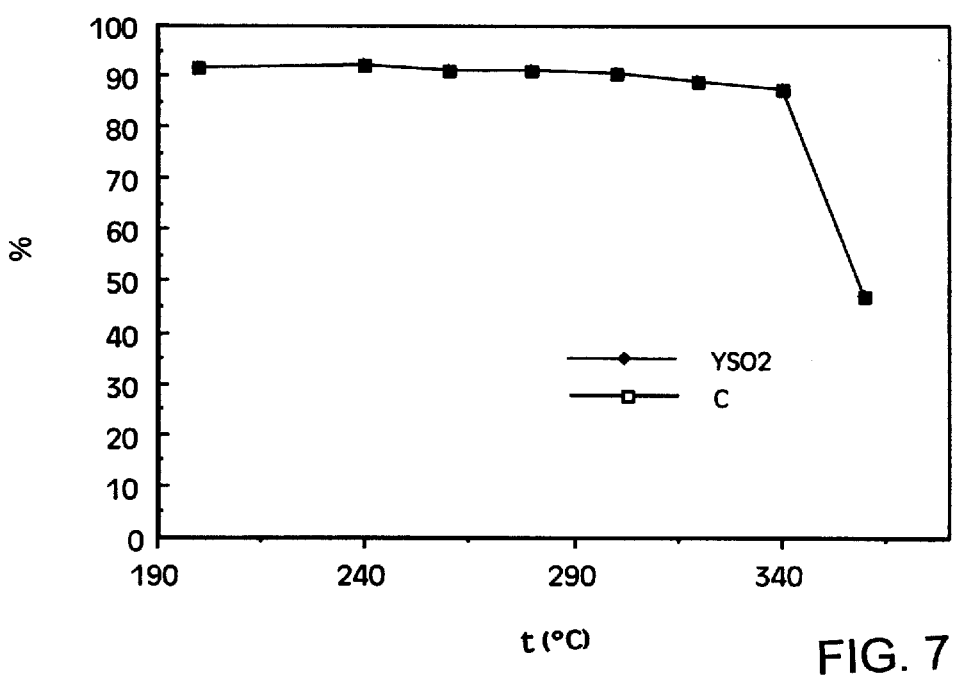
Figure 8:
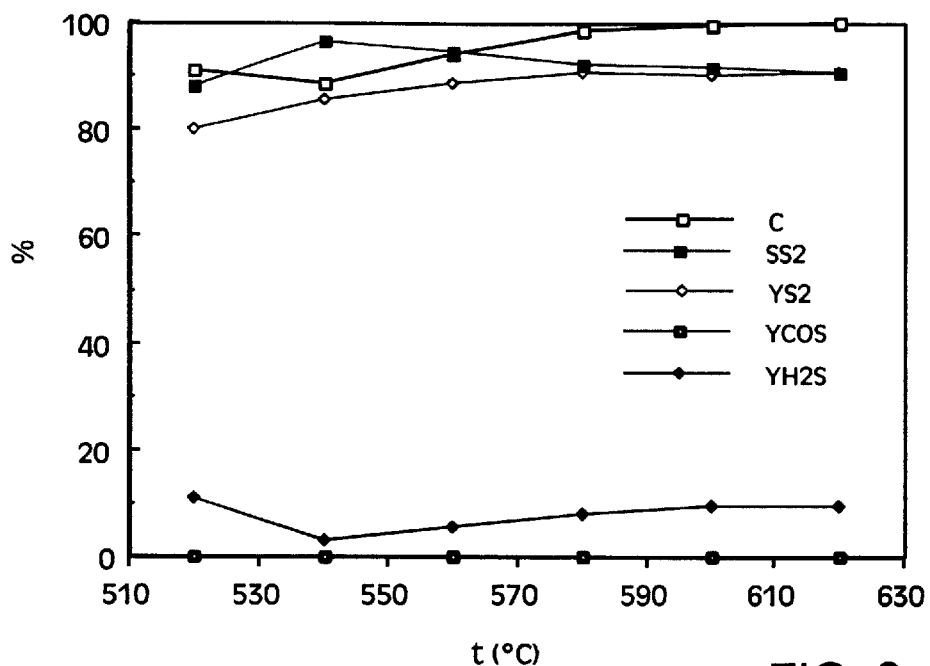
Figure 9:
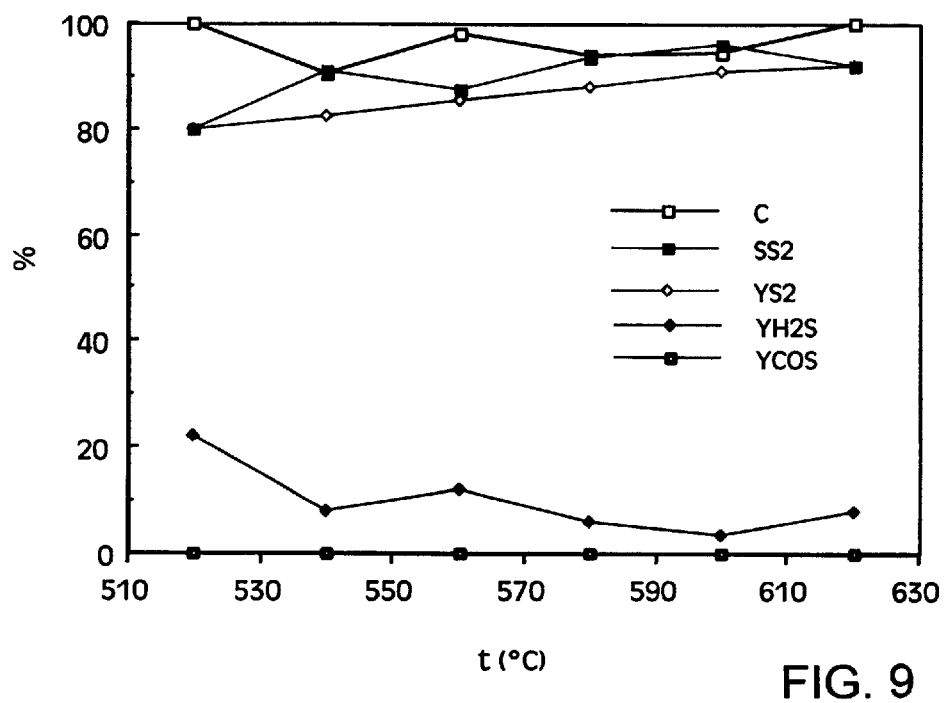
Figure 10:
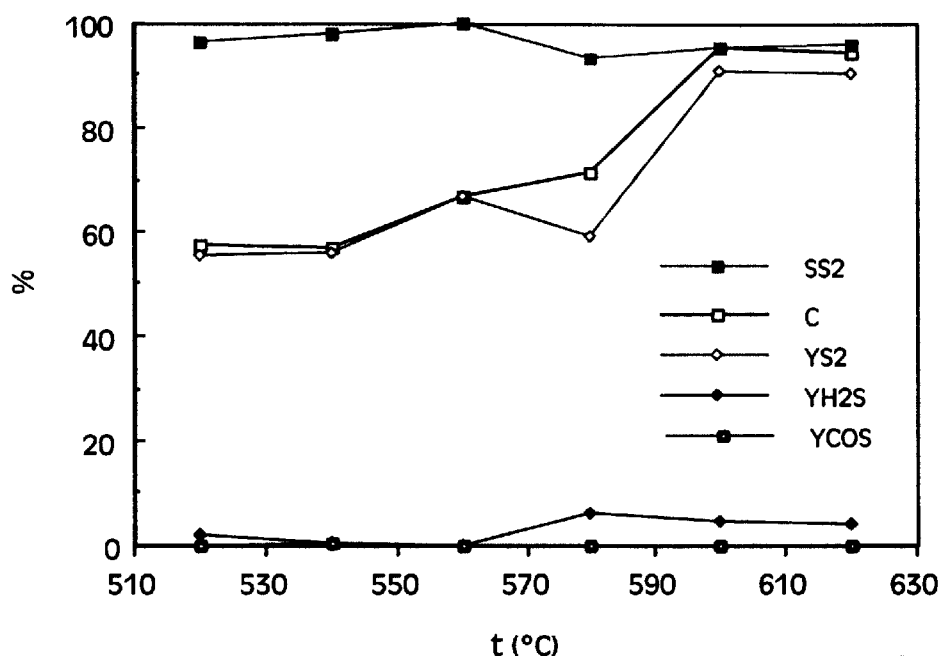
Figure 11:
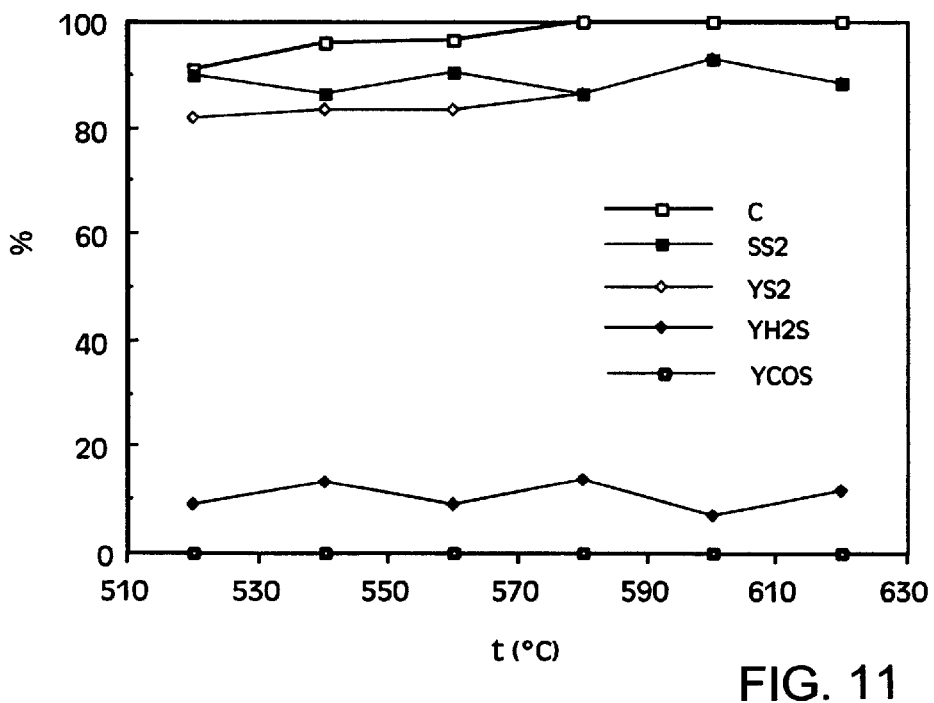
Figure 12:
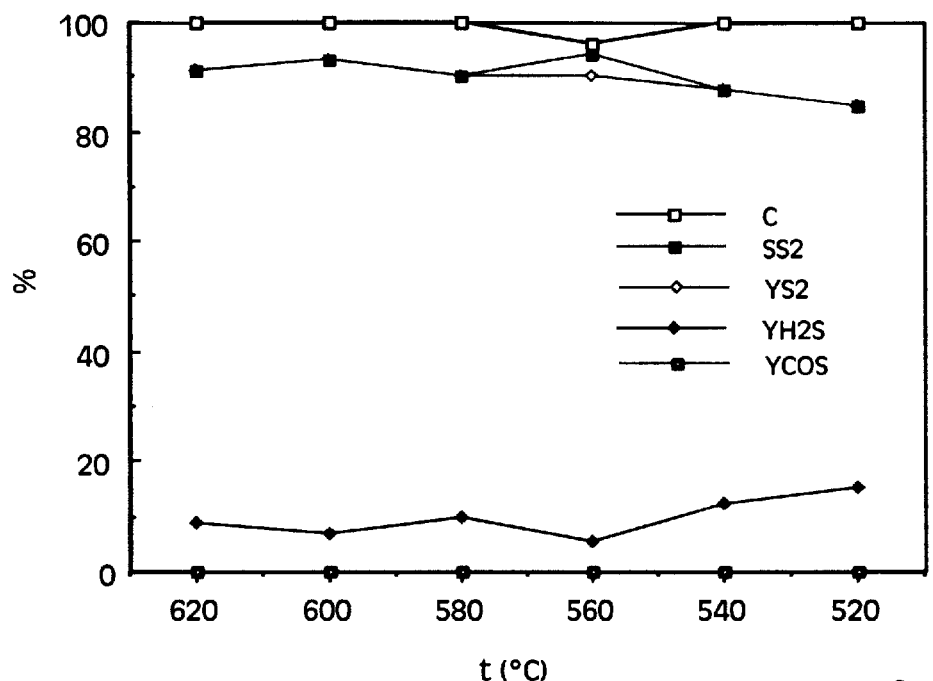
Figure 13:
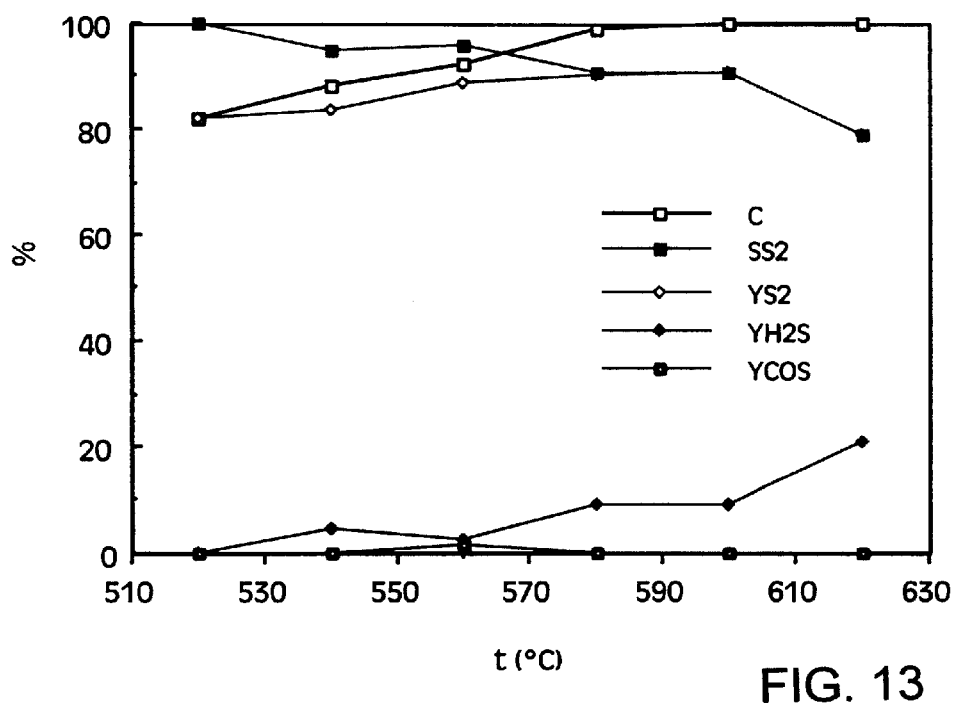
Figure 14:
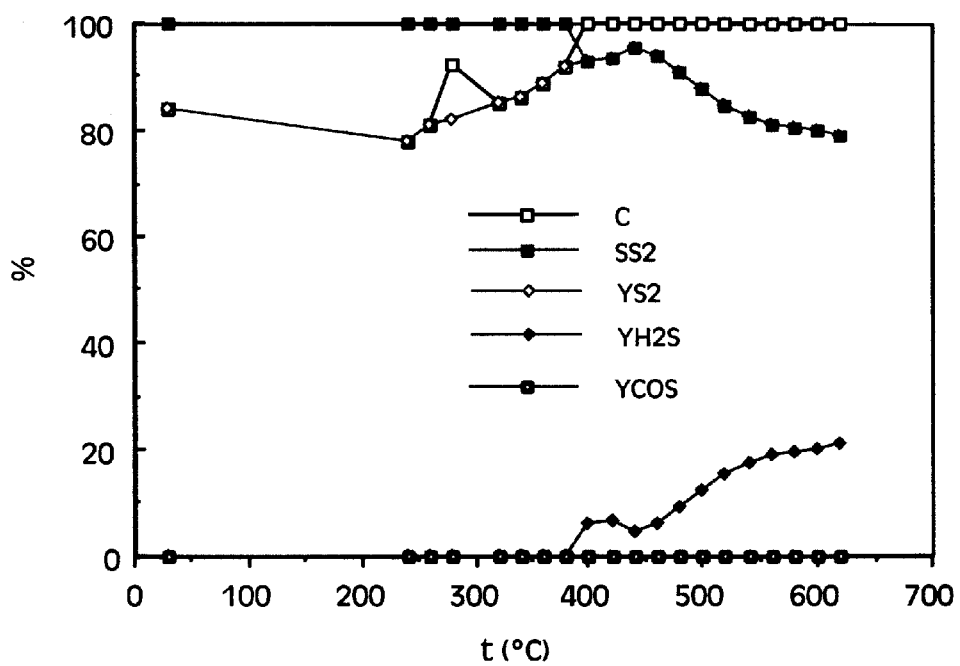
Figure 15:
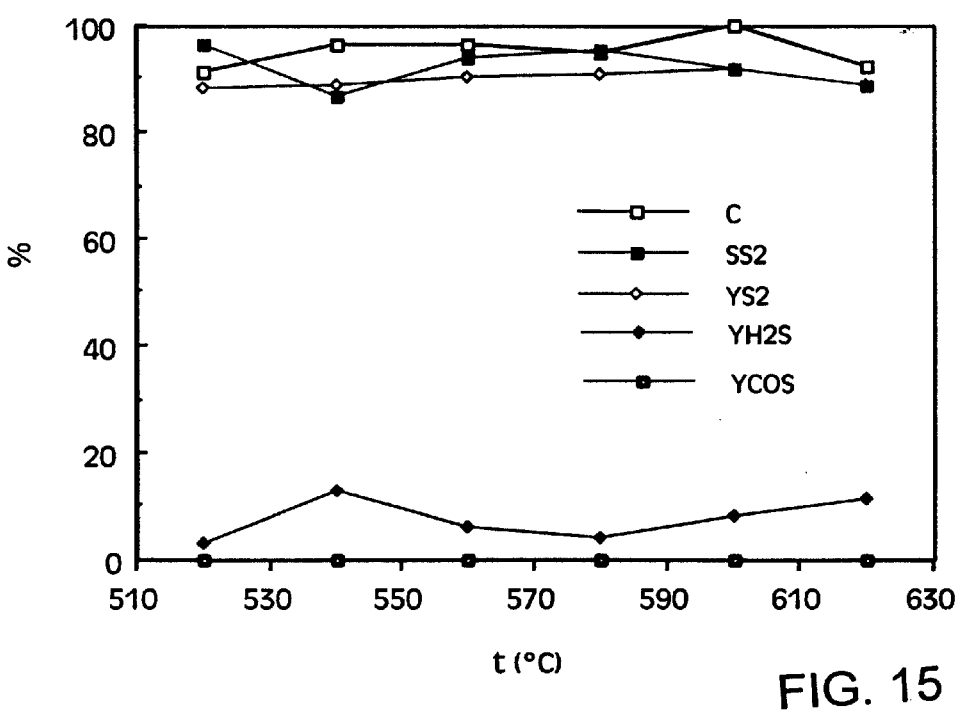
Figure 16:
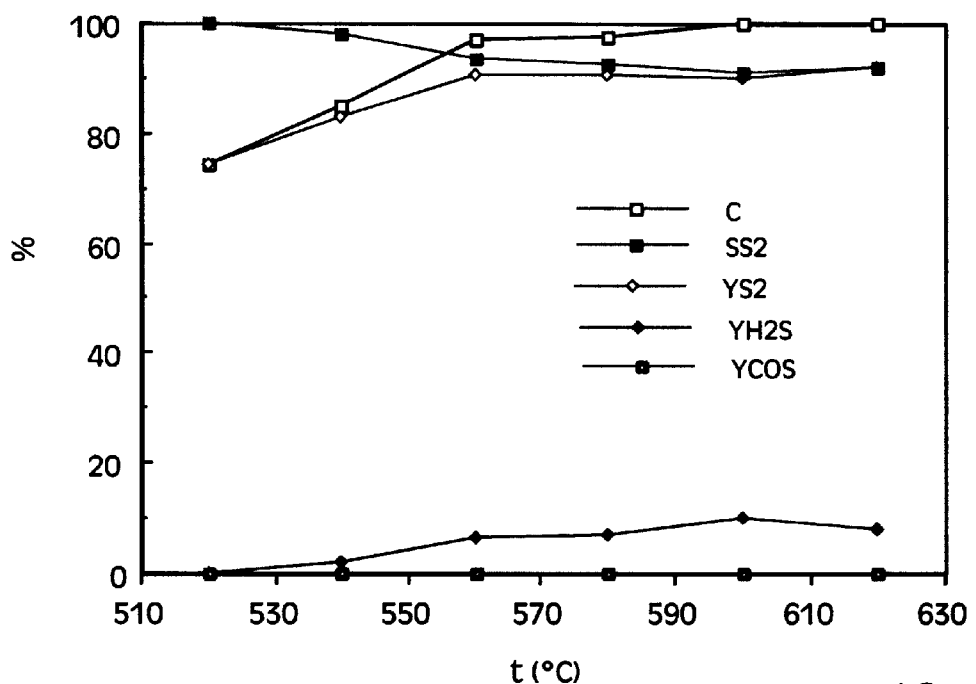
Figure 17:
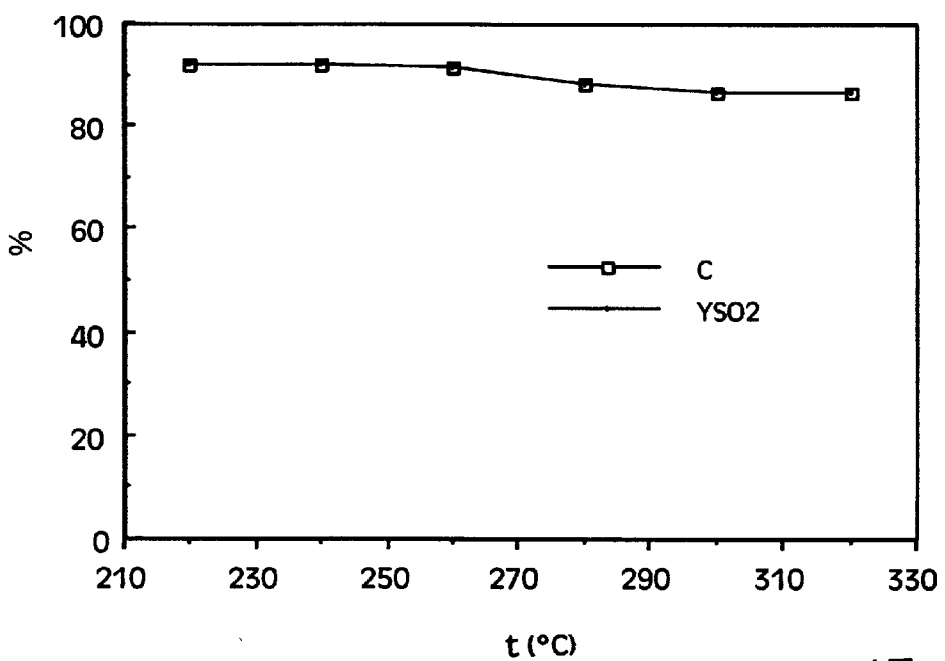
Figure 18:
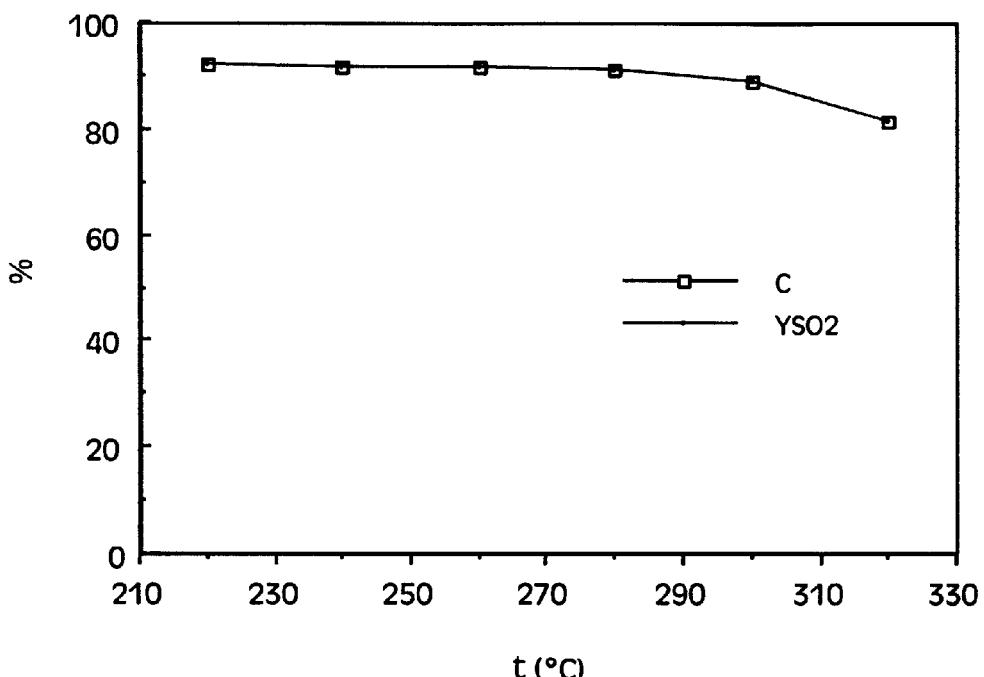
Figure 19:
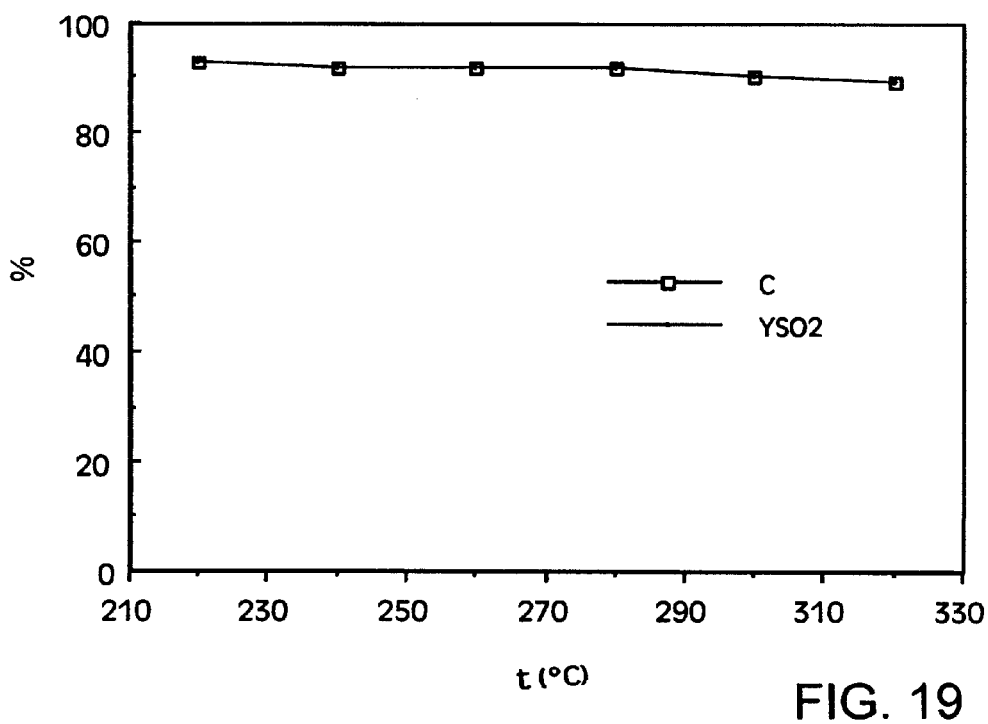
Figure 20:
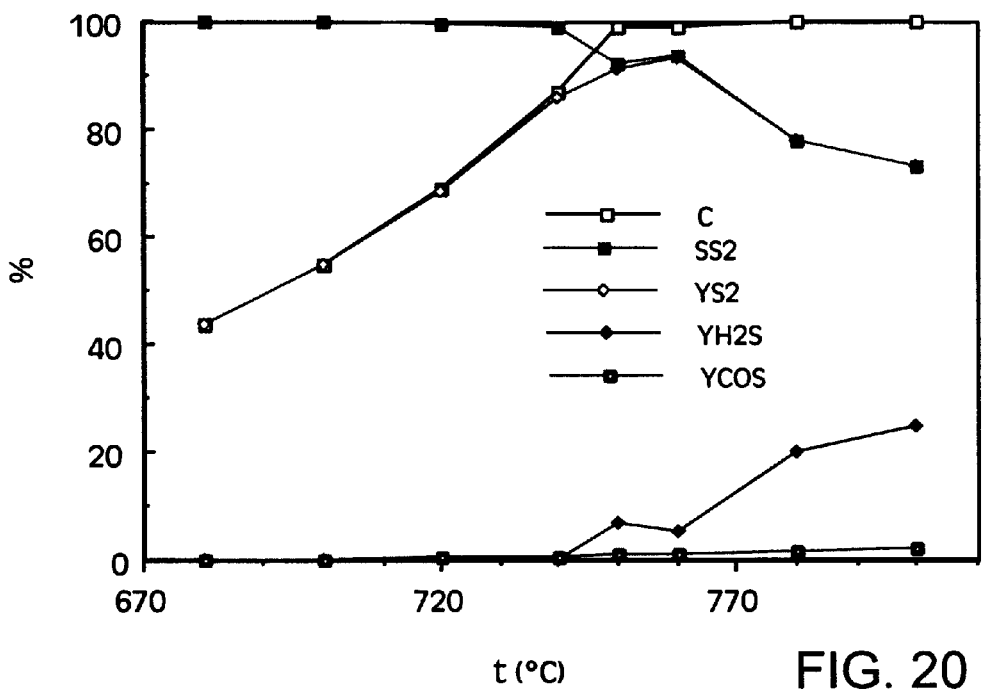
Figure 21:
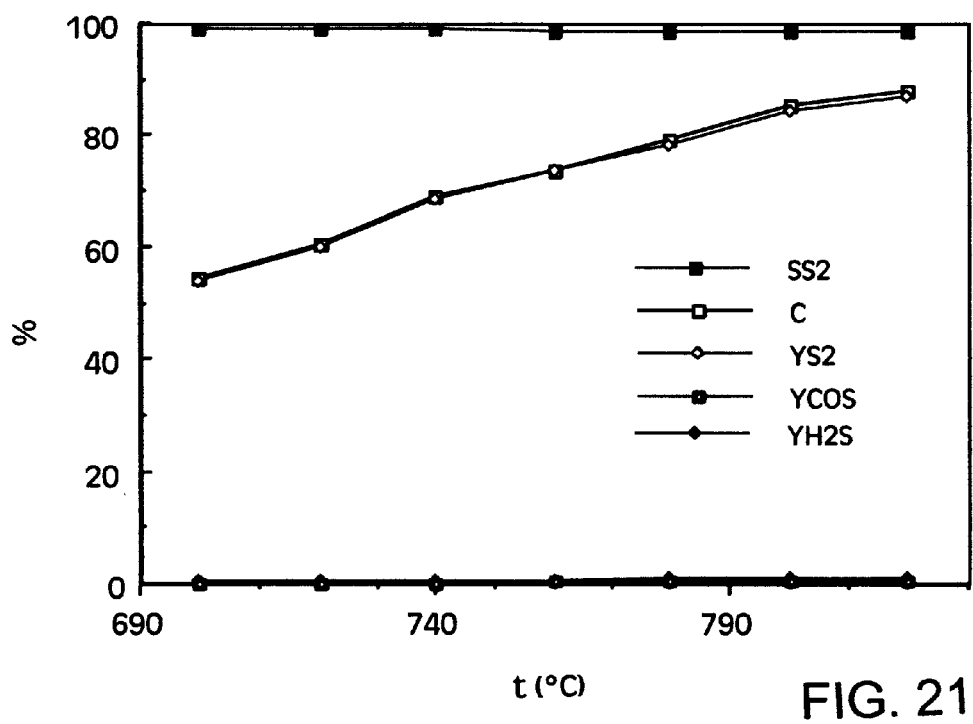
Figure 22:
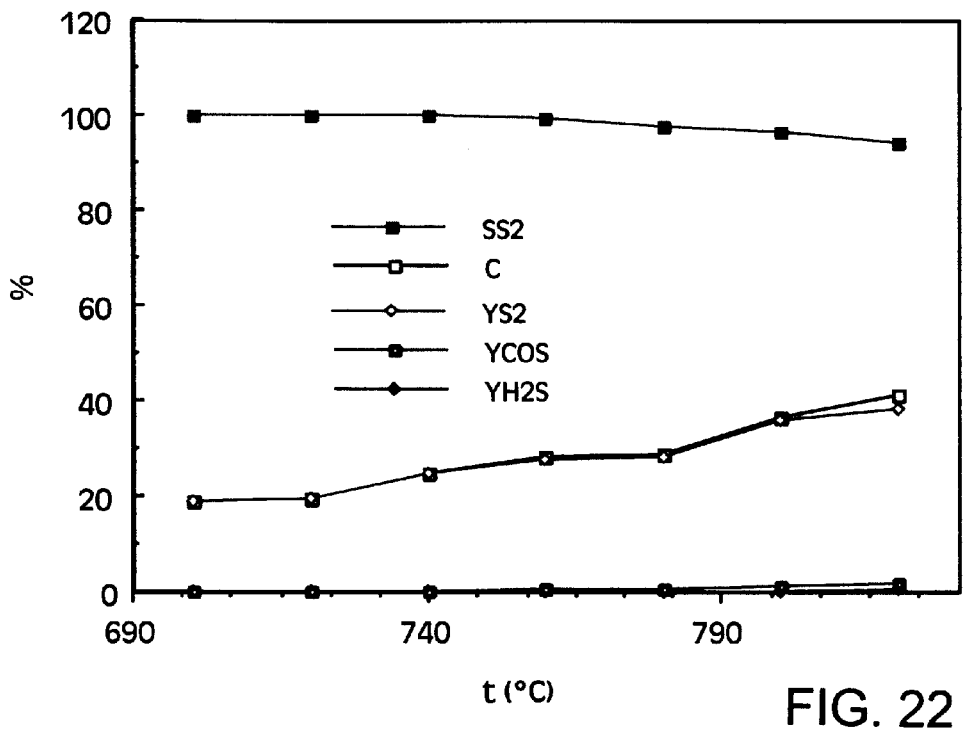
Figure 23:
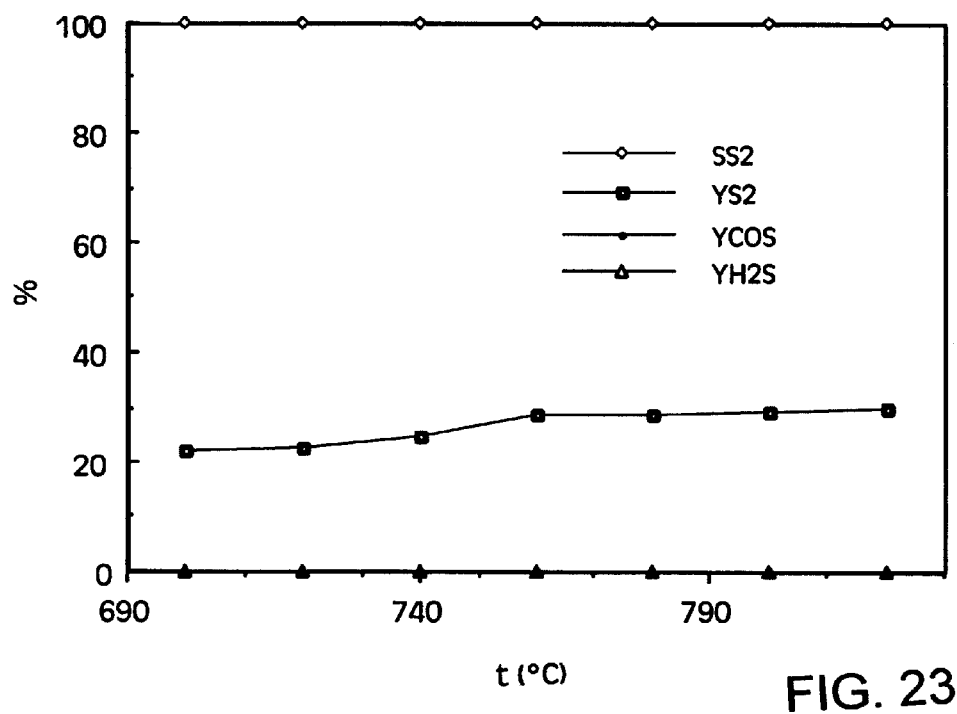
Figure 24:
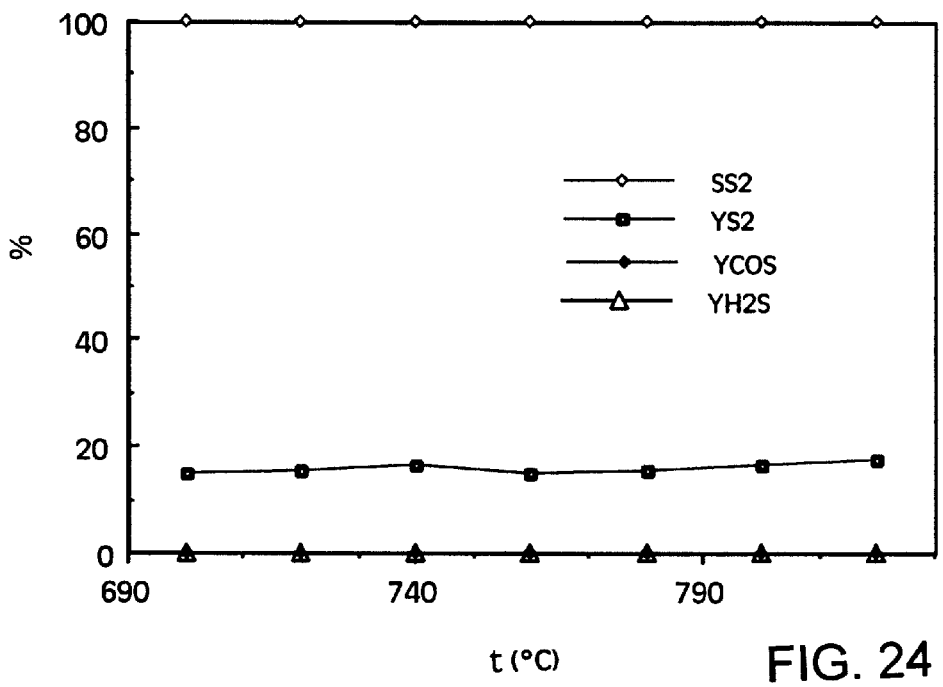
Figure 25:
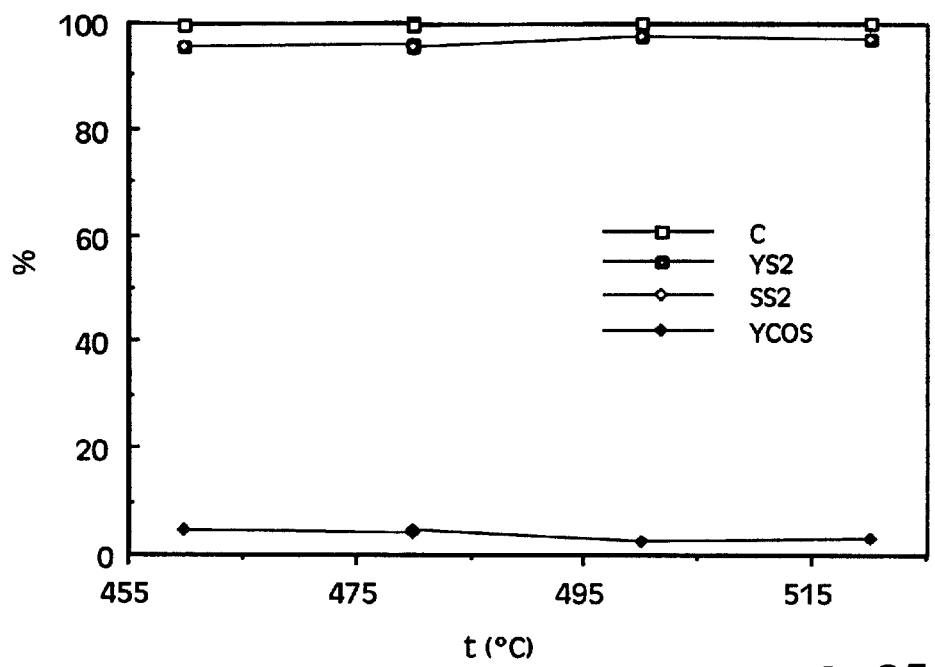
Figure 26:
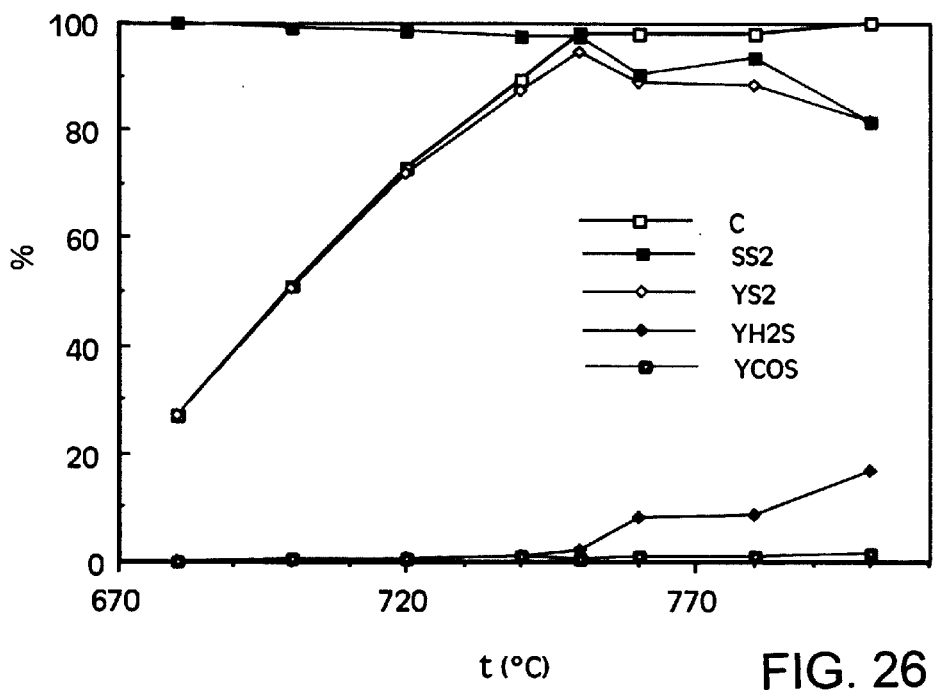
Figure 27:
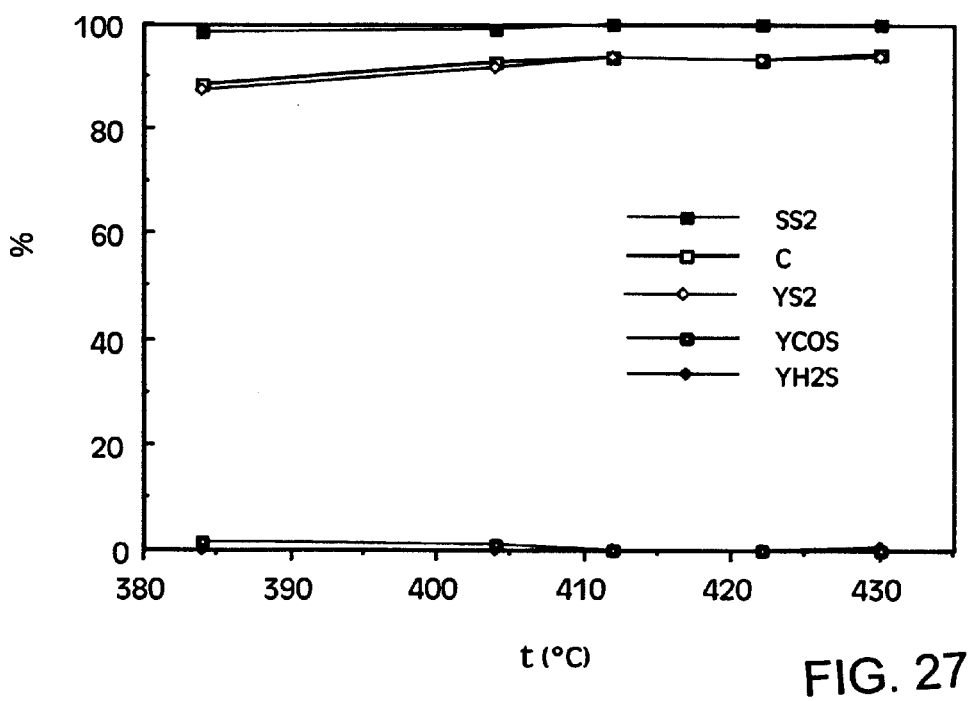
Figure 28:
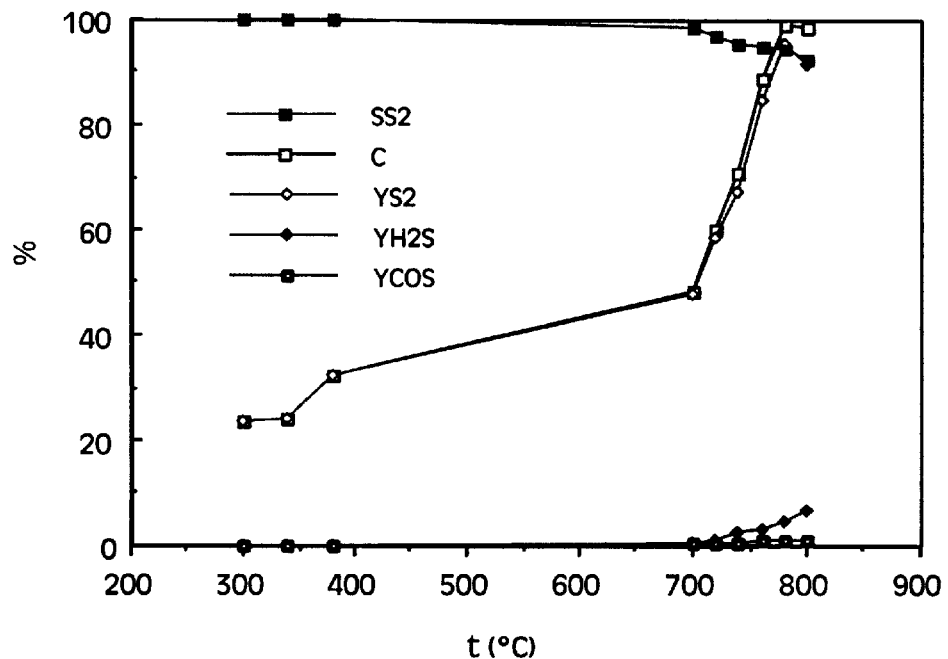
Figure 29:
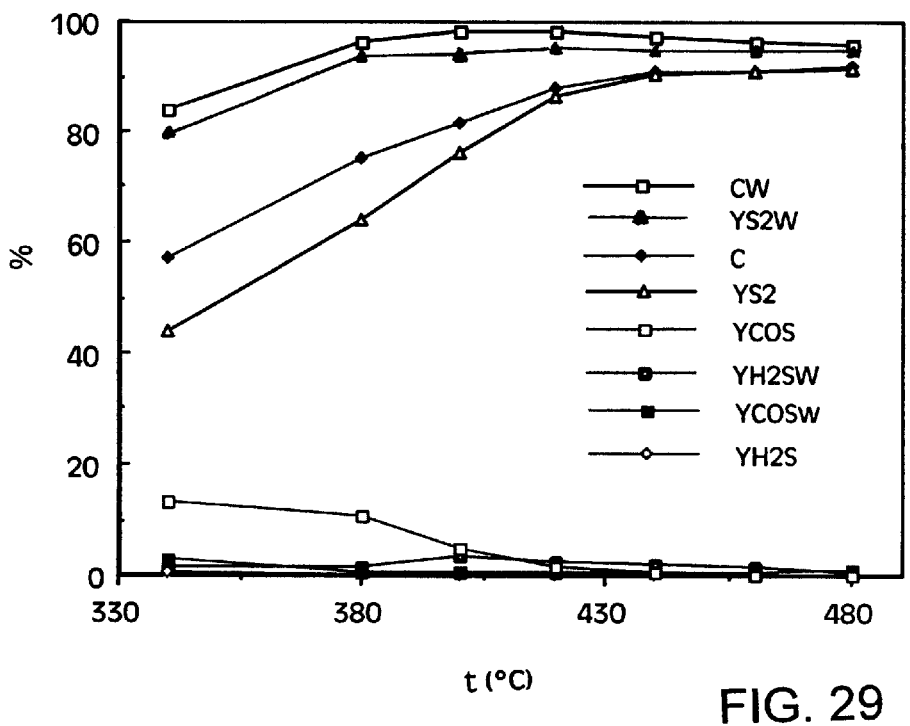
Figure 30:
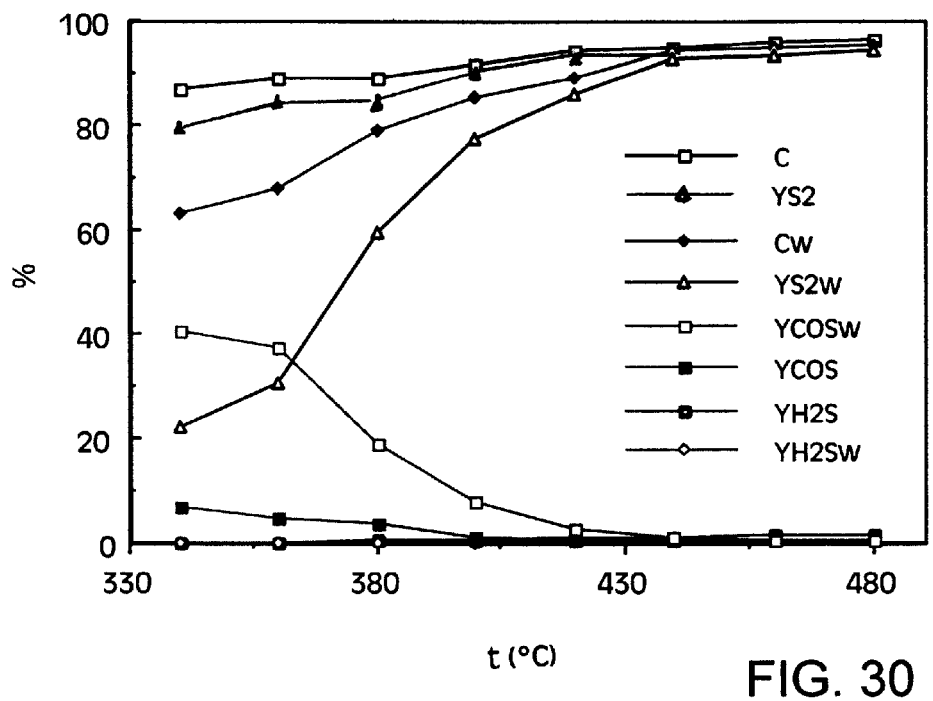
Figure 31:
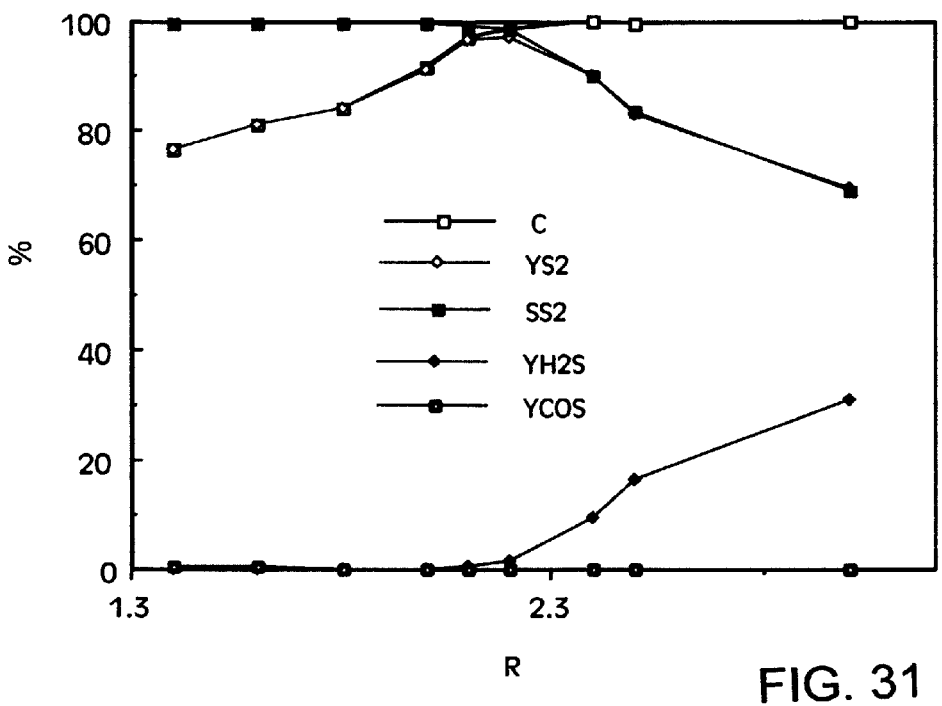
Figure 32:
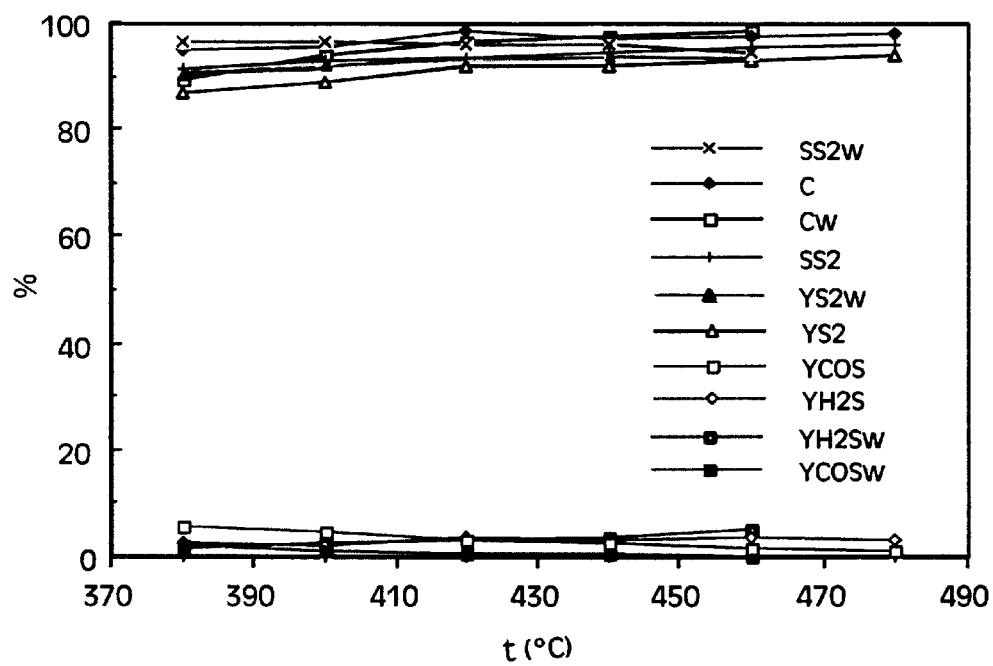
Figure 33:
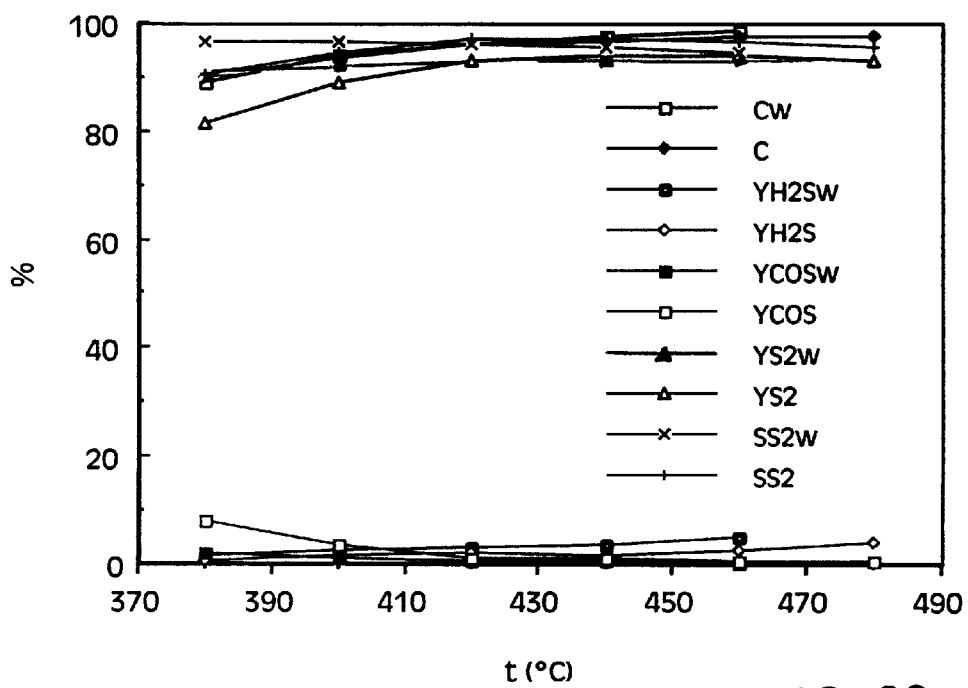
Figure 34:
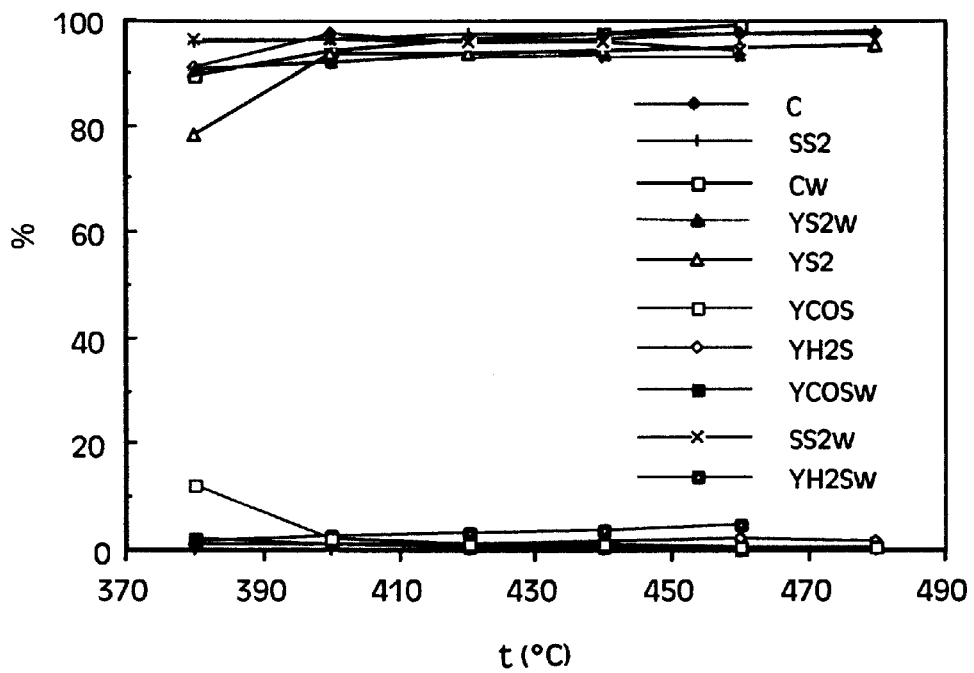
Figure 35:
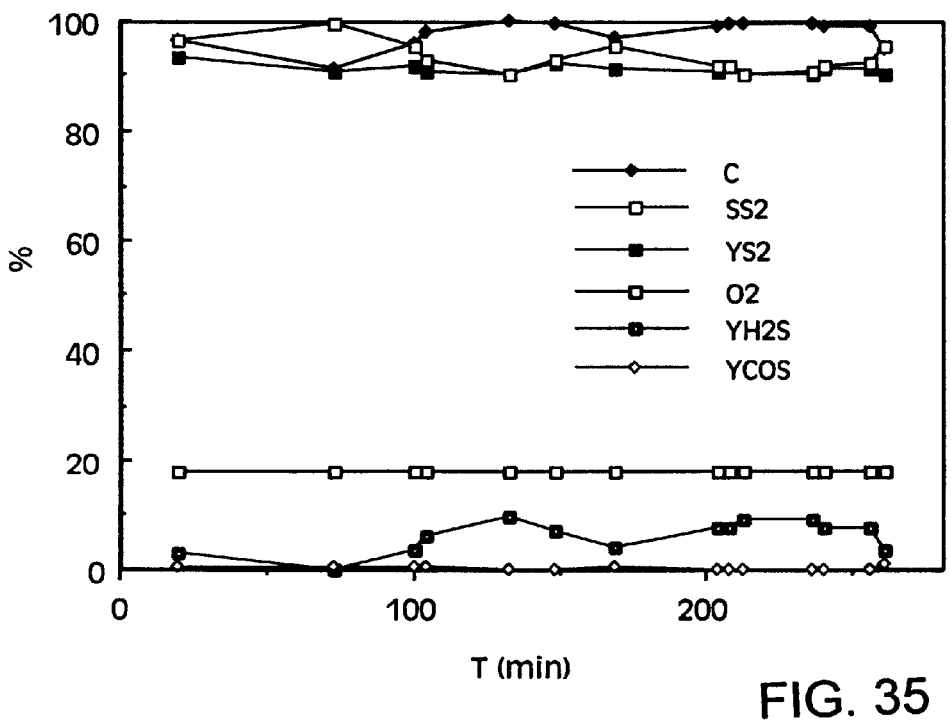
Figure 36:
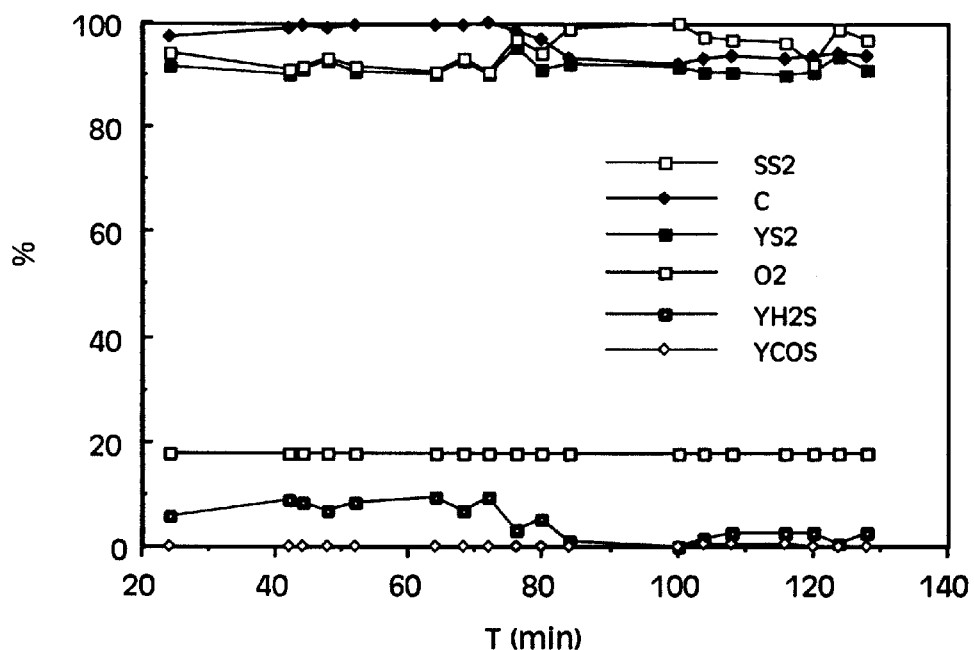
Figure 37:
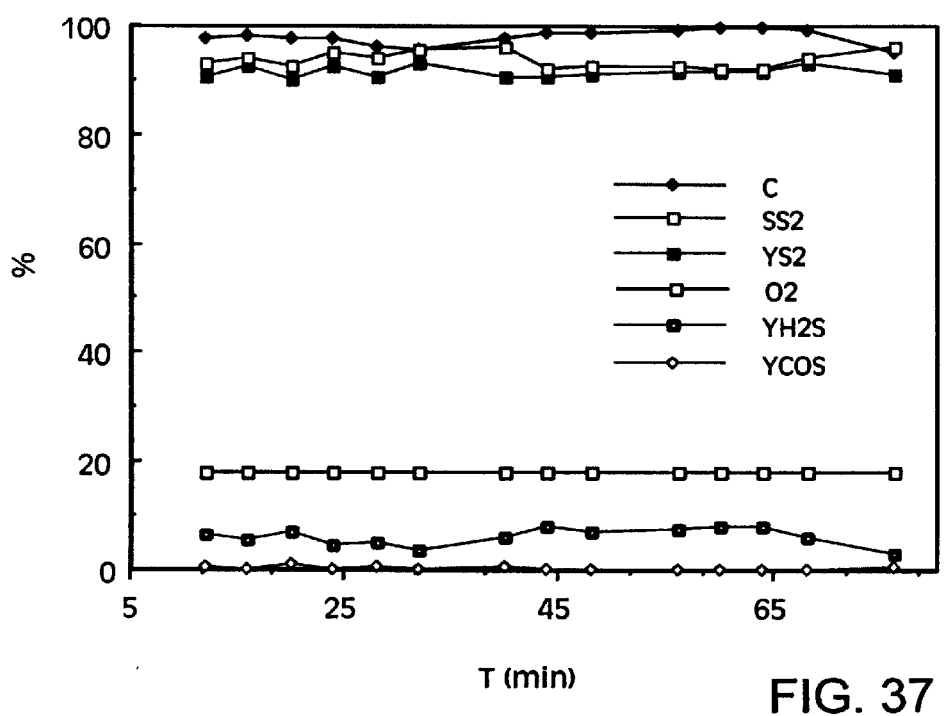

The inventors have unexpectedly discovered a new class of catalysts that reduce sulfur dioxide to elemental sulfur, with dramatically improved critical qualities over prior art catalysts. This is accomplished by sulfiding a metallic salt impregnated support by either gas or solution sulfidation. The most important qualities which benefit from the present invention are high conversion efficiencies, specificity of conversion, and resistance to water poisoning. Thus, the inventors have produced a whole new class of catalysts which for the first time are capable of practical uses in industry.

The comparison chart above demonstrates the very unexpected nature of the inventors discovery. It compares several prior art oxide formulations with the same formulas in a sulfide form. The comparison shows that most sulfide forms have little function over a reasonable range of temperatures, and where they do show an activity, have poor or somewhat inferior characteristics to their oxide counterparts. In the face of these clear findings, the research communities could be discouraged for any serious experimental efforts into sulfide forms of sulfur dioxide reducing catalysts.

Catalst Preparation Steps

In its simplest form, the inventive catalysts are prepared by first impregnating a substrate with a solution of the metallic compounds, and then sulfiding these metals to form the final catalyst. Standard processing procedures such as drying and calcination are also employed. In two major embodiments of the invention, the sulfidation can be accomplished by gaseous treatment or by a sulfiding solution. When desired, these methods can be employed in combination.

Gaseous sulfidation converts the oxide forms of the metallic components to the sulfide form. When the solution sulfidation embodiment of the present invention is used, typically a nitrate form of the metallic components is chemically converted to the sulfide form by treatment by solutions such as ammonium sulfide in ordered to produce sulfide precipitates.

The compositions of the catalysts were analyzed using X-ray diffraction, BET surface area analysis, and atomic absorption elemental analysis. Gaseous treatment appears to produce a more surface sulfiding effect, while treatment with solutions accomplishes sulfidation of the inner portions of the substrate. Gaseous treatment also tends to provide a final product with some of the oxide form of the metals remaining, while treatment by solution results in a more complete conversion to sulfide forms.

Oxygen Free Environment

To avoid the reintroduction of the oxide form of the metallic components to the catalyst, the preparation steps enumerated below which take place during or after the sulfiding step must be accomplished in an oxygen limited environment. By example the impregnation step generally can take place in a standard gaseous environment.

Typical, the gaseous stream used to exclude oxygen in the relevant steps is nitrogen, argon, helium, or other inert gas or gas combination. These flow-through stream conveniently serve both to deliver the sulfidation gas stream to the impregnated substrate in the case of gaseous treatment, and to draw unwanted byproducts away from the developing catalyst.

Metal Solution Impregnation of Substrate

A common first step in the various embodiment of the inventive preparation method is the impregnation of a substrate, typically alumina, with a solution of the metal salt or metal salts which will make up the final formulation. Metal salts of the desired formulation are first dissolved in water or other appropriate solvents or solvent combinations. While the metal salts are typically in nitrate form, they can also be less preferred metal carbonates or nitrites.

The solution carrying the metallic components is then used to impregnate the alumina substrate with the various metal components of the desired formulation. The metal salt solution impregnation step can be accomplished in an ambient gas environment. The impregnated substrate is then evaporated to dryness.

When the various metal salts have compatible solubilization parameters, they are place in solution in one step. Those metal salts that do not have compatible solubilization parameters, such as molybdenum, must be impregnated into the substrate and dried sequentially, as described below.

The alumina substrate used in the present invention can be of virtually any type, such as $\alpha$ alumina, $\beta$ alumina, or $\gamma$ alumina. The latter is employed in the examples set forth below. Because of the ease of processing available in the present invention, the substrate can be in a wide range of $\gamma$ forms, such as plates, granules, extrusions, pellets, honeycomb, monoliths, etc.

In some cases, such as with a molybdenum component, the solution parameters exceed those of more standard metal components, and would cause premature precipitation and other difficulties if combined together. In such cases, the carrier can be impregnated sequentially with the incompatible solvents. By example, molybdenum is typically soluble at a much more basic pH than is compatible with other metallic nitrates. Therefore, molybdenum would be introduced on the substrate only after treatment with the other metal nitrates, including the drying steps.

Evaporation of Solution

The dissolved metal nitrates are then admixed with the alumina substrate, and the solution evaporated. This step can also occur in an ambient gas environment. The evaporation of the solution can be accomplished by any number of conventional means, such as by vacuum, gentle heating, or simply leaving the solution open to evaporation. One standard means, gentle heating, can take place at under about 200° C. At preferred range of evaporation temperatures are from 100° C. to 150° C. This heating also serves to evaporate crystalline water.

Sulfidation by Gaseous Treatment

In one embodiment of the present invention, the dried, metal compound impregnated substrate described above is sulfidated by gaseous treatment. X ray diffraction studies appear to indicate that in this embodiment of the inventive preparation method the sulfide components are most concentrated at the surface of the substrate, but the metallic component in the deeper layers of the substrate seem to maintain their oxide form. The active surface of the catalyst includes all areas of the catalyst which come in contact with the reactant, and which are activity catalyzing $SO_2$ into elemental sulfur. This typically includes the surfaces of porous areas.

As a first step in the inventive preparation method using sulfidation by gaseous treatment, the impregnation of a substrate and drying are accomplished as above. This impregnated, dried substrate serves as the precursor to the final gas sulfided catalyst.

Removal of Crystalline Water

After the drying step, the impregnated is treated at a higher temperature in part to assure a more complete removal of water which was not eliminated during the drying step. The treatment typically is given for 15 minutes to four hours, depending on such parameters as the size of material to be treated, and the temperature of treatment. A preferred time is about a half an hour. The temperature of treatment can range from 200° C. to 300° C., with the preferred temperature at about 2500° C.

Decomposing of Nitrate

The dried impregnated substrate is then treated at a third higher temperature level. When the metals in solution are introduced in the form of nitrates, this step serves to decompose their nitrate component. The nitrate component is usefully decomposed and potential nitrate contaminants reduced.

Typically, the nitrate decomposition temperature is at 300° C. to 450° C., with a preferred temperature of around 400° C. The treatment can take place from 15 minutes to 6 hours, depending on the size of the precursor catalyst, the temperature employed, the feed stream speed, etc.

This step further decomposes remaining nitrate components and serve to more completely decompose nitrate and vaporize $NO_2$. These vaporized materials are eliminated by the feed stream. Exemplifying the effects of this step is;

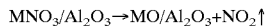

$MNO_3/Al_2O_3 \rightarrow MO/Al_2O_3 + NO_2\uparrow$

Calcination of Impregnated Substrate

Once the metal components have been dried on the surface of the alumina, the impregnated alumina is calcinated. This results in changes to the structure of the catalyst components.

The final, highest level of heat treatment is the calcination step, which results in the formation of a metal oxide complex of the various components, rather than a standard alloy. Calcination can be accomplished at temperatures from 5000° C. to 7000° C. Depending on the selected temperature, the calcination step can be accomplished in from 2 hours to 2 days. A preferred treatment would be at 600° C. for 4 hours. The calcination temperature is in part determined by the structural limitations of the substrate. After calcination, the impregnated substrate is typically allowed to cool to room temperature in order to move the materials to a second vessel. However, when the same vessel is used for sulfiding, the cooling step is not necessary.

Gaseous Sulfidina of Impregnated, Calcinated Precursor Catalyst

The calcinated product described above is then treated at a higher temperature by a sulfur containing gaseous stream. This treatment by gas converts (the metals near or on the surface of the monolith from the oxide to the sulfide form.) For this reason, the steps up to this point in the gaseous sulfidation process need not be carried out in an oxygen free environment. Sulfidation takes place under an oxygen free environment.

The sulfiding of the calcinated precursor catalyst by gas has several parameters, all of which serve to balance the various choices when selecting the others. This provides great flexibility in processing techniques, and allows industry to specifically optimize the process for particular substrates or catalyst formulations, and for temperatures, gas stream flow rates and concentrations, etc. which are the most economical.

Typically, the sulfiding continues until the catalyst precursor is saturated. This point can be judged as completed when the gaseous treatment stream has the same concentration of the sulfur component both before and after flowing over the catalyst precursor. Partial sulfiding can also been provided if certain mixed sulfide/oxide surface formulations having advantageous qualities are required.

The various parameters for the gas sulfiding process are mutually determinant. For instance, if high temperatures are used, sulfidation can be accomplished very quickly. Low gaseous flow rate or low sulfide content of the treatment stream can be compensated for by treating a small amount of precursor catalyst over a longer period of time.

The range of temperatures available to effectively accomplish sulfidation of the precursor catalyst are broad. Selection of treatment temperature will take into account such factors as cost, ease of processing, and substrate stability. Effective sulfidation temperatures can typically range from 200° C. to 700° C. A more preferred range for sulfidation temperatures is from 350° C. to 650° C. The most preferred range is from 500° C. to 620° C.

The time needed for effective sulfidation treatment is also flexible. For instance, with a good flow rate and high $SO_2$ concentration, effective treatment can take as little as 10 minutes. On the other hand, if only a low feed rate and temperature is available, or to provide gentle treatment parameters, a treatment time of five days or more can be provided. A more typical range of treatment time would be 30 minutes to 24 hours. A most preferred range of treatment time is about an hour.

A wide range of treating gas concentrations can be used to sulfide the catalyst precursor. These can range from 0.1% to 100%. Very concentrated treating gas is particularly useful when treating a large amount of catalyst precursor over a reasonable time period. When low concentration treating gas is available, longer time and higher temperature of processing is required. A preferred range of treating gas concentration is 5%–40%. The most preferred range is 10%.

The gases used to treat the catalyst precursor can be of any number of formulations. For instance sulfur dioxide in a methane stream ($SO_2/CH_4$), sulfur dioxide in a hydrogen stream ($SO_2/H_2$), or sulfur dioxide in a carbon monoxide stream ($SO_2/CO$). The various non-sulfur dioxide materials listed above can also be used in combination as a reductant for the sulfur dioxide component to produce the gaseous sulfides, $H_2S$ and/or COS for sulfidation of metal oxides. Thus, one could have an effective treatment stream in the present invention which would include varying levels of methane, hydrogen, and carbon monoxide with the desired percentages of sulfur dioxide. Other gaseous sources of sulfides can also be used directly, such as $H_2S$ and/or COS, by themselves or in combination with the gases described above.

An example of the gaseous sulfiding preparation is the sulfidation of $Fe_4Co_1Ni_1Mo_1Pr_6Mn_2O_{26.33}/\gamma$—$Al_2O_3$. A fresh $H_2S$ gas can be used for the sulfidation.

$Fe_4Co_2Ni_2Mo_1Mn_2O_{17.66}/\gamma$—$Al_2O_3$ oxide catalyst is reacted with $H_2S$ at 620° C. for between 0.5 and 4 hours. Lower temperatures are also workable when $H_2S$ is employed. An example is the preparation of $Bi_2O_xS_y/\gamma$—$Al_2O_3$ from the reaction of oxide catalyst with $H_2S$ at 300° C. for an extensive period (24 hours). The performance of this catalyst is shown in Table 1.

Sulfidation by Treatment with Solution

A second major embodiment of the inventive catalyst production method is sulfidation by treatment of the impregnated catalyst precursor with a sulfiding solution. This method results in a more uniform deposition of the sulfide form of the catalytic metals through the final catalyst, rather than a more surface effect as seen in the gaseous treatment method described above. Another important feature of the solution method is that sulfidation appears to be much closer to full completion; there is a lower amount of remaining oxide form as compared to the gaseous treatment method. The active surface of the catalyst includes all areas of the catalyst which come in contact with the reactant, and which are activity catalyzing $SO_2$ into elemental sulfur. This typically includes the surfaces of porous areas.

In the solution sulfidation method, the evaporated metal nitrates impregnated substrate is treated by a sulfiding solution after the impregnation and drying steps described above. The sulfiding solution treated substrate is then heated at four different levels. Each temperature level serves to promote the development of the catalyst, often partially accomplishing some of the purposes of the others. However, there is a tendency for a certain specialized effect to take place in each of the different levels.

At the first, lowest temperature, a simple drying of the solution carrier is accomplished. The next highest temperature treatment serves to remove crystalline water. The third yet higher temperature acts to decompose ammonium nitrate and sulfide to vaporize other unwanted potential contaminating materials. The final, highest temperature acts as a calcination step, which forms the final catalytically active metal complex product.

Solution Sulfidation

Various solutions can be employed to convert the nitrate forms of the precursor catalyst to the sulfide form. Typical, an ammonium sulfide solution is used. The ammonium sulfide solution is introduced in stoichiometric proportions to the metallic components, with an excess, typically 10%, in order to ensure complete conversion:

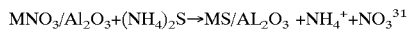

The sulfidation solution can be prepared at concentrations which are most convenient for the production effort. Ranges from 5% to 30% concentration will, among others, be useful in the present invention. A standard laboratory concentration is around 10%. The sulfidation solution, which can be combined with the metal solution first, is simply admixed directly with the precursor treated substrate.

Drying Step

This second drying step in this case typically includes heating, and is distinct from the initial drying step of the original metal salt impregnated substrate. The sulfided solution treated impregnated substrate is dried at from 50° C.–100° C. Virtually all of the surface water and other solution liquid is removed in this step, as is much of the deeper water, such as that in the pores and close to the surface. The drying step serves to release to some degree potentially contaminating nitrogen components and water in a gaseous state.

It is at this point that additional impregnation and sulfiding steps are taken where metallic salts with incompatible solution criteria are to be included in the formulation. A typical metallic component of this kind would be molybdenum. The additional impregnation and sulfiding steps are described in the example section below, and in the equation above.

Removal of Crystalline Water

After the drying step, the impregnated is treated at a higher temperature in part to assure a more complete removal of water which was not eliminated during the drying step. The treatment typically is given for 15 minutes to four hours, depending on such parameters as the size of material to be treated, and the temperature of treatment. A preferred time is about a half an hour. The temperature of treatment can range from 200° C. to 300° C., with the preferred temperature at about 250° C.

Decomposing of Nitrate and Sulfide

The dried impregnated substrate is then treated at a third higher temperature level. When the metals in solution are introduced in the form of nitrates, this step serves to decompose ammonium nitrate and sulfide components. The ammonium nitrate and sulfide components are decomposed and potential contaminants reduced.

Typically, the nitrate decomposition temperature is at 350° C. to 450° C., with a preferred temperature of around 400° C. The treatment can take place from 15 minutes to 6 hours, depending on the size of the precursor catalyst, the temperature employed, the feed stream speed, etc.

This step further decomposes remaining nitrate components and serve to more completely vaporize $NO_2$, $NH_3$, and $H_2S$ potential contaminants. These vaporized materials are then eliminated by the feed stream. Exemplifying the effects of this step is;

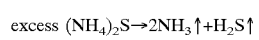

Calcination

The final, highest level of heat treatment is the calcination step, which the inventors hypothesize results in the formation of a metal sulfide complex of the various components, rather than a standard alloy. Calcination can be accomplished at temperatures from 500° C. to 700° C. in the absence of oxygen. Depending on the selected temperature, the calcination step can be accomplished in from 2 hours to 2 days. A preferred treatment would be at 620° C. for 4 hours.

Inventive Catalyst Performance

Testing Equipment and Parameters

Experiments were carried out between 200° C. and 820° C. The space velocity ranged from 1,000 $h^{-1}$ to 15,000 $h^{-1}$. The molar ratio of the sum of H2 and CO to $SO_2$ ranged from 1.4 to 3.0, while the molar ratio of $H_2$ to CO varied from 0.3 to 5 to cover the entire composition range of synthesis gas produced from different types of coal and from methane.

A schematic flow diagram of the apparatus is shown in the figure. The experimental setup consists of three separate sections: the gas supply section, the main reactor, and the detection and analysis section. Gases are supplied from compressed gas cylinders (Matheson Gas Products) to gas flow meters before entering a gas mixer. Two sizes of the tubular reactors are used in the experiments. The smaller one is fabricated from a 1.2-cm-o.d. with a 1-mm wall thickness quartz tube. The larger one is from a 2.5-cm-o.d. with a 1-mm wall thickness quartz tube. The entire reactor is mounted inside a tubular furnace.

The smaller reactor is 7 cm long, while the larger reactor is 17 cm long. The reactors consist of three zones. The inlet or the preheating zone (2.5 cm long) is packed with 20 mesh quartz chips, the reaction zone is packed with catalysts (either 30–40 sieve particles or 3 mm diameter by 5 mm height granules), and the outlet zone (1 cm) is packed with quartz chips (20 mesh), mainly for the purpose of supporting the catalyst, which sat on a perforated quartz plate having seven holes for gas exit. A thermocouple, reaching the center of the catalytic packing, provide measurement of the temperature of catalytic reactions.

After the last section of the reactor, the gases pass through a sulfur collector at room temperatures, and then enter into an on-line trap cooled in an ice bath to condense water before entering a six-port sampling valve which is used to inject the products of the catalytic reactions into the gas chromatograph. Finally, the exit gases pass into a scrubber containing concentrated NaOH.

The inlet and exit gases are analyzed by using a gas chromatograph equipped with a column switching valve and a thermal conductivity detector. A 4-meter Porapak P (60–80 mesh) column was employed at 90° C. (100 mA) for the analysis of $SO_2$, $H_2S$, COS, $H_2O$, and $N_2$. Another 4-meter column with Molecular sieve 13x at room temperature was used for the analysis of $H_2$, CO, and $O_2$. The carrier gas is helium.

Calculations and Definitions

The catalytic conversion of $SO_2$ to elemental sulfur by synthesis gases or methane may produce unwanted side products such as $H_2S$, COS, and $CS_2$. The success of a process for the reduction of $SO_2$ will partly depend on the development of a catalyst which will maximize the selectivity of elemental sulfur over side byproducts. The conversion efficiency of $SO_2$, the yield of the side products, and the selectivity of elemental sulfur were evaluated for different formulations of catalysts.

The conversion (%) of $SO_2$ (C) is calculated by;

$$C = 100 \ (F^i_{SO2} - F^o_{SO2})/F^i_{SO2}$$

while, $F^i_{SO2}$ is the flow rate (ml/h) of input $SO_2$, and $F^o_{SO2}$ is the flow rate of output $SO_2$.

The yield (%) of hydrogen sulfide ($Y_{H2S}$), carbonyl sulfide ($Y_{COS}$), and elemental sulfur ($Y_{S2}$) is respectively calculated by $$Y_{H2S} = 100 \ F_{H2S}/F^i_{SO2},$$

$$Y_{COS} = 100 \ F_{COS}/F^i_{SO2}, \text{ and}$$

$$Y_{S2} = C - Y_{H2S} - Y_{COS}$$

while, $F_{H2S}$ and $F_{COS}$ are the flow rate (ml/h) of $H_2S$ and COS output respectively.

The selectivity (%) of elemental sulfur ($S_{S2}$) is calculated by $$S_{S2} = Y_{S2}/(Y_{S2} + Y_{H2S} + Y_{COS})$$

The space velocity (S.V.) is defined as $$S.V. = F^{Total}/V_{cat} \ (h^{-1})$$

while, $F^{Total}$ is the sum of the flow rates (ml/h) of all input gases, i.e. $F^{Total} = F^i SO_2 + F^i_{CO} + F^i H_2$, and $V_{cat}$ is the volume (ml) of the catalyst.

Performance Results

I. LOW $SO_2$ LEVELS.

The following tests were done at low (0.29%–3.37%) $SO_2$ concentrations in the feed stock with various catalytic formulations. These conditions reflect aspects of Claus reaction tail gas treatment and power plant flue gas treatment. Formulations evaluated include transition metals, combinations of transition metals and rare earth metals, combinations of transition metals with other active metal components, alkaline and alkaline earth metals.

The $SO_2$ concentrations generally ranged between 0.29% and 3.37%. It was demonstrated that the inventive catalysts were very effective for the conversion of low concentrations of $SO_2$ to elemental sulfur. It was also demonstrated that syngas and $H_2S$ can be effectively used as reductants for the reduction of $SO_2$ to elemental sulfur.

A. Transition Metal Formulations

The following four examples show the performance of transition metal formulations at low $SO_2$ concentrations. The first three use syngas, while the fourth employs $H_2S$ as a reductant:

1. The reduction of 0.3% $SO_2$ with a syngas [$(H_2/CO)=3$] over a catalyst comprised of $Fe_4Co_2Ni_2Mo_1Mn_2O_{17.66}$-$y^Sy$ supported on $\gamma$-$Al_2O_3$. The molar ratio of syngas to $SO_2$ in the feed gas stream was 2, i.e. [$\{(3H_2+CO)/SO_2\}=2$]. The catalyst weighs 10 gr. A sulfur yield of 78.7% was obtained at 640° C. (Table 1)

2. The reduction of 0.3% $SO_2$ with a syngas [$(H_2/CO)=3$] over a catalyst comprised of $Fe_4Co_2Ni_2Mo_1Mn_2O_{17.66}$-$y^Sy$ supported on $\gamma$-$Al_2O_3$. The molar ratio of syngas to $SO_2$ in the feed gas stream was 5.33, i.e. [$\{(3H_2+CO)/SO_2\}=5.33$]. The catalyst weighs 10 gr. A sulfur yield of 92.6% was obtained at 420° C. (Table 2)

3. The reduction of 0.3% $SO_2$ with a syngas [$(H2/CO)=3$] over a catalyst comprised of $Fe_4Co_2Ni_2Mo_1Mn_2O_{17.66}$-$y^Sy$ supported on $\gamma$-$Al_2O_3$. The molar ratio of syngas to $SO_2$ in the feed gas stream was 8, i.e. [$\{(3H_2+CO)/SO_2\}=8$]. The catalyst weighs 10 gr. A sulfur yield of 90% was obtained at 440° C. (Table 3)

4. The reduction of $SO_2$ with $H_2S$ over a catalyst comprised of $Fe_4Co_2Ni_2Mo_1Mn_2S_{17.66}$ supported on $\gamma$-$Al_2O_3$. The molar ratio of $H_2S$ to $SO_2$ in the feed gas stream was 2. The catalyst weighs 10 gr. Sulfur yields of 92.3% and 90.2% were obtained with a feed gas $SO_2$ concentration of 3.37% (at 240) and 0.92% (at 200° C.), respectively. (Table 4a, b, c)

B. Combined Transition Metal with Rare Earth Metal Formulations

The following test provides characteristics of combined transition metal with rare earth metal formulations, using syngas as a reductant, with 0.3% $SO_2$ in the feed stock:

1. The reduction of 0.3% $SO_2$ with a syngas [$(H_2/CO)=3$] over a catalyst comprised of $Fe_4Co_1Ni_1Mo_1Pr_6Mn_2O_{26.33}$-$y^Sy$ supported on $\gamma$-$Al_2O_3$. The molar ratio of syngas to $SO_2$ in the feed gas stream was 8, i.e. [$\{(3H_2+CO)/SO_2\}=8$]. The catalyst weighs 10 gr. A sulfur yield of 90.5% was obtained at 620° C. (Table 5)

C. Combined Transition Metal with Other Active Metal Formulations

The following four examples provide characteristics of inventive catalysts incorporating other active metal components with low $SO_2$ concentrations in the feed stock.

1. The reduction of 0.3% $SO_2$ with a syngas [$(H_2/CO)=3$] over a catalyst comprised of $Fe_4Co_1Ni_1Bi_5Cu_5O_{16.33}$-$y^Sy$ supported on $\gamma$-$Al_2O_3$. The molar ratio of syngas to $SO_2$ in the feed gas stream was 8, i.e. [{($3H_2$+CO)/$SO_2$}=8]. The catalyst weighs 10 gr. A sulfur yield of 92% was obtained at 620° C. (Table 6)

2. The reduction of 0.3% $SO_2$ with a syngas [($H_2$/CO)=3] over a catalyst comprised of $Bi_1Cu_1O_{2.5}$-$y^sy$ supported on $\gamma$-$Al_2O_3$. The molar ratio of syngas to $SO_2$ in the feed gas stream was 2, i.e. [{($3H_2$+CO)/$SO_2$}=2]. The catalyst weighs 10 gr. A sulfur yield of 90.9% was obtained at 600° C. (Table 7)

3. The reduction of 0.3% $SO_2$ with a syngas [($H_2$/CO)=3] over a catalyst comprised of $Bi_2O_3$-$y^sy$ supported on $\gamma$-$Al_2O_3$. The molar ratio of syngas to $SO_2$ in the feed gas stream was 8, i.e. [{($3H_2$+CO)/$SO_2$}=8]. The catalyst weighs 10 gr. The results show that a sulfur yield of 92.8% was obtained at 600° C. (Table 8)

4. The reduction of 0.3% $SO_2$ with a syngas [($H_2$/CO)=3] over a catalyst comprised of $Bi_2S_3$ supported on $\gamma$-$Al_2O_3$. The molar ratio of syngas to $SO_2$ in the feed gas stream was 5.33, i.e. [{($3H_2$+CO)/$SO_2$}=5.33]. The catalyst weighs 10 gr. The results show that a sulfur yield of 93% was obtained at 600° C. (Table 9)

D. Alkaline and Alkaline Earth Metal Formulations

The following five tests provide characteristics of inventive catalysts incorporating alkaline metals with low $SO_2$ concentrations in the feed stock. The first four examples use syngas, while the fifth employs $H_2S$ as a reductant for the conversion of $SO_2$ to elemental sulfur:

1. The reduction of 0.3% $SO_2$ with a syngas [($H_2$/CO)=3] over a catalyst comprised of $Li_2O_1$-$y^sy$ supported on $\gamma$-$Al_2O_3$. The molar ratio of syngas to $SO_2$ in the feed gas stream was 2, i.e. [{($3H_2$+CO)/$SO_2$}=2]. The catalyst weighs 10 gr. A sulfur yield of 90.6% was obtained at 600° C. (Table 10)

2. The reduction of 0.3% $SO_2$ with a syngas [($H_2$/CO)=3] over a catalyst comprised of $Na_2O_1$-$y^sy$ supported on $\gamma$-$Al_2O_3$. The molar ratio of syngas to $SO_2$ in the feed gas stream was 2.66, i.e. [{($3H_2$+CO)/$SO_2$}=2.66]. The catalyst weighs 10 gr. A sulfur yield of 95.2% was obtained at 440° C. (Table 11)

3. The reduction of 0.3% $SO_2$ with a syngas [($H_2$/CO)=3] over a catalyst comprised of $K_2O_1$-$y^sy$ supported on $\gamma$-$Al_2O_3$. The molar ratio of syngas to $SO_2$ in the feed gas stream was 2, i.e. [{($3H_2$+CO)/$SO_2$}=2]. The catalyst weighs 10 gr. A sulfur yield of 91.9% was obtained at 600° C. (Table 12)

4. The reduction of 0.3% $SO_2$ with a syngas [($H_2$/CO)=3] over a catalyst comprised of $Cs_2O_1$-$y^sy$ supported on $\gamma$-$Al_2O_3$. The molar ratio of syngas to $SO_2$ in the feed gas stream was 2, i.e. [{($3H_2$+CO)/$SO_2$}=2]. The catalyst weighs 10 gr. A sulfur yield of 92% was obtained at 620° C. (Table 13)

5. The reduction of $SO_2$ with $H_2S$ over a catalyst comprised of $Na_2S$ supported on $\gamma$-$Al_2O_3$. The molar ratio of $H_2S$ to $SO_2$ in the feed gas stream was 2. The catalyst weighs 10 gr. Sulfur yields of 92.2%, 92.2%, and 92.9% were obtained at 220° C. with $SO_2$ concentrations of 0.29%, 0.92%, and 3.37%, respectively. (Table 14a, b, and c)

II. HIGH $SO_2$ LEVELS

The following tests show the capabilities of the inventive catalysts with high $SO_2$ concentration in the feed stock, that is at 5%, 33.3%, and 66.6%. These conditions are similar to those from Hot Gas Cleanup Systems employed in Advanced Integrated Gasification Combined Cycle (IGCC) Power Plants and from regenerable $SO_2$ scrubbers. The following formulations were evaluated: transition metal, combined transition metal with rare earth metal, combined transition metal with other active metal, and noble metals. It was also demonstrated that methane, carbon monoxide, and/or syngas can all be effectively used as reductants for the reduction of $SO_2$ to elemental sulfur.

A. Transition Metal Formulations

The following two examples show the performance of transition metal formulations using methane as a reductant with high $SO_2$ concentrations in the feed stock. The effect of support materials for the catalysts were evaluated in the second example.

1. The reduction of 66.6% $SO_2$ with methane over a catalyst comprised of $Fe_4Co_1Ni_1Mo_1Cr_2Mn_2O_{17.55}$-$y^sy$ supported on $\gamma$-$A_2O_3$. The molar ratio of methane to $SO_2$ in the feed gas stream was 2. The catalyst (20–50 mesh) weighs 1 gr. A sulfur yield of 92.9% was obtained at 760° C. (Table 15)

2. The effect of carriers on the catalytic reduction of 66.6% $SO_2$ by methane at various temperatures. The catalyst (granules) were composed of $CO_3O_4$-$y^sy$ supported on $\gamma$-$Al_2O_3$. The flow rates of methane and $SO_2$ were 1,333 ml/hr and 2,667 ml/hr, respectively. The space velocity was 5,000 $h^{-1}$. Based on the results of the sulfur yield, the effectiveness of the carrier followed the following order: $Al_2O_3$, $SiO_2$, molecular sieve 13X, and then molecular sieve 5A. (Table 16 a, b, c, and d)

B. Rare Earth Metal Formulations

The following test provides characteristics of inventive catalysts incorporating rare earth metals, using CO as a reductant with high $SO_2$ concentrations in the feed stock.

1. The reduction of 5% of $SO_2$ with carbon monoxide over a catalyst comprised of $Pr_6O_{11}$-$y^sy$ supported on $\gamma$-$Al_2O_3$. The molar ratio of CO to $SO_2$ in the feed gas stream was 2. The catalyst (30–40 mesh) weighs 0.3 gr. A sulfur yield of 97.2% was obtained at 480° C. (Table 17)

C. Combined Transition Metal with Other Active Metal Formulations

The following test provides characteristics of inventive catalysts incorporating combined transition metal with other active metals, using methane as a reductant and high $SO_2$ concentrations in the feed stock.

1. The reduction of 66.6% $SO_2$ with methane over a catalyst comprised of $Fe_2Co_1Ni_2Se_1O_{7.33}$-$y^sy$ supported on $\gamma$-$Al_2O_3$. The molar ratio of methane to $SO_2$ in the feed gas stream was 0.5. The catalyst (30–40 mesh) weighs 1 gr. A sulfur yield of 94.2% was obtained at 740° C. (Table 18)

D. Noble Metal Formulations

The following tests provide characteristics of inventive catalysts incorporating noble metals with high $SO_2$ concentrations in the feed stock.

1. The reduction of 33.3% $SO_2$ with a syngas [($H_2$/CO)=3] over a catalyst comprised of $Re_2O_7$-$y^sy$ supported on $\gamma$-$Al_2O_3$. The molar ratio of syngas to $SO_2$ in the feed gas stream was 2, i.e. [{($3H_2$+CO)/$SO_2$}=2]. The catalyst (20–50 mesh particles) weighs 1 gr. A sulfur yield of 93.6% was obtained at 412° C. (Table 19)

2. The reduction of 66.6% $SO_2$ with methane over a catalyst comprised of $Re_2O_7$-$y^sy$ supported on $\gamma$-$Al_2O_3$. The molar ratio of methane to $SO_2$ in the feed gas stream was 2. The catalyst (20–50 mesh) weighs 1 gr. A sulfur yield of 93.6% was obtained at 780° C. (Table 20)

III. FEED GAS CONTAINING $SO_2$ AND GASEOUS CONTAMINANTS $SO_2$ produced from industrial sources is often admixed with one or more gaseous contaminants, such as $H_2O$, $H_2S$, COS, and $O_2$. As reported in the literature, these contaminants drastically decrease sulfur yield when using the current catalysts.

The following tests demonstrated the superior performance of the inventive catalysts which were conducted under conditions similar to those found in Claus tail gas treatment (containing $H_2O$, $H_2S$, and COS), regenerable $SO_2$ scrubbers (containing $H_2O$ and $H_2S$), IGCC (containing $O_2$), and power plant flue gas cleanup (containing $O_2$ and $H_2O$).

1. The effect of 15% of water vapor in the feed gas on the catalytic reduction of $SO_2$ by syngas [$(H_2/CO)=3$]. The catalyst (30–40 mesh) was comprised of $Fe_4Co_2Ni_2Mo_1Mn_2O_{17.66-y}S_y$ supported on alumina. The space velocity was 10,000 $h^{-1}$. The subscript "w" indicates runs with 15% water vapor in the feed. The results show that the sulfur yields were the same above temperatures of 440° C. and that the water vapor did not affect the performance of the catalyst. (Table 21)

2. The effect of 15% water vapor in the feed gas on the catalytic reduction of $SO_2$ by syngas [$(H_2/CO)=0.75$]. The catalyst (30–40 mesh) was comprised of $Fe_4Co_2Ni_2Mo_1Mn_2O_{17.66}$-$y^S y$ supported on alumina. The space velocity was 10,000 $h^{-1}$. The subscript "w" indicates runs with 15% water vapor in the feed. The results show that sulfur yields were the same above temperatures of 440° C. and that the water vapor did not effect the performance of the catalyst. (Table 22)

3. The effect of the molar ratio of syngas to $SO_2$ ($R=[3H_2+CO]/SO_2$) on the catalytic reduction of $SO_2$ in the presence of 15% water vapor at 480° C. The catalyst (30–40 mesh) was comprised of $Fe_4Co_2Ni_2Mo_1Mn_2O_{17.66}$-$y^S y$ supported on alumina. The space velocity was 10,000 $h^{-1}$. A sulfur yield of 91.2% was obtained at the stoichiometric ratio, R=2. The largest yield of sulfur (97.1%) was obtained at R=2.2. (Table 23)

4. The effect of 10% $H_2S$ in the feed gas on the catalytic reduction of $SO_2$ by syngas ([$H_2/CO$]=3). The catalyst (30–40 mesh) was comprised of $Fe_4Co_2Ni_2Mo_1Mn_2O_{17.66}$-$y^S y$ supported on alumina. The space velocity was 10,000 $h^{-1}$. The results show that the addition of $H_2S$ in the feed gas did not affect the sulfur yield to any appreciable extent. (Table 24)

5. The effect of 10% COS in the feed gas on the catalytic reduction of $SO_2$ by syngas ([$H_2/CO$]=3). The catalyst (30–40 mesh) was comprised of $Fe_4Co_2Ni_2Mo_1Mn_2O_{17.66}$-$y^S y$ supported on alumina. The space velocity was 10,000 $h^{-1}$. The results show that the addition of $H_2S$ in the feed gas did not affect the sulfur yield in any appreciable extent. (Table 25)

6. The effect of 10% $H_2S$ plus 10% COS in the feed gas on the catalytic reduction of $SO_2$ by syngas ([$H_2/CO$]=3). The catalyst (30–40 mesh) was comprised of $Fe_4Co_2Ni_2Mo_1Mn_2O_{17.66}$-$y^S y$ supported on alumina. The space velocity was 10,000 $h^{-1}$. The results show that the simultaneous addition of $H_2S$ and COS in the feed gas did not affect the sulfur yield in any appreciable extent. (Table 26)

7. The catalyst stability study in the reduction of 10% $SO_2$ with syngas [$(H_2/CO)=1.5$] containing 18% oxygen at 580° C. The catalyst was comprised of $Fe_4Co_1Ni_1Mo_1Mn_2O_{15.33}$-$y^S y$ supported on $\gamma$-$Al_2O_3$. The molar ratio of syngas to ($SO_2+O_2$) in the feed gas stream was 2. The catalyst (granules) weighs 5 gr. The catalyst shows stable catalytic activity over the entire 260 minute run. (Table 27)

8. The catalyst stability study in the reduction of 10% $SO_2$ with syngas [$(H_2/CO)=1.5$] containing 18% oxygen at 560° C. The catalyst was comprised of $Fe_4Co_1Ni_1Mo_1Mn_2O_{15.33}$-$y^S y$ supported on $\gamma$-$Al_2O_3$. The molar ratio of syngas to ($SO_2+O_2$) in the feed gas stream was 2. The catalyst (granules) weighs 5 gr. The catalyst shows a stable activity over the entire 128 minute run. (Table 28)

9. The catalyst stability study in the reduction of 10% $SO_2$ with syngas [$(H_2/CO)=1.5$] containing 18% oxygen at 540° C. The catalyst was comprised of $Fe_4Co_1Ni_1Mo_1Mn_2O_{15.33}$-$y^S y$ supported on $\gamma$-$Al_2O_3$. The molar ratio of syngas to ($SO_2+O_2$) in the feed gas stream was 2. The catalyst (granules) weighs 5 gr. The catalyst shows a stable activity over the entire run of 76 minutes. (Table 29)

EXAMPLE 1

SULFIDATION BY GAS REACTION $Fe_4Co_2Ni_2Mn_2Mo_1O_{17.67-x}S_x/\gamma$—$Al_2O_3$ 1. The following metal nitrates were dissolved in 100 ml $H_2O$;

| | | | | |
|---|---|---|---|---|
| $Fe(NO_3)_3$ | $9H_2O$ | 42.6538 g | F.W. 404 | Acros Organics NJ |
| $Co(NO_3)_3$ | $6H_2O$ | 15.3633 g | F.W. 291.03 | Aldrich Chem. |
| $Ni(NO_3)_2$ | $6H_2O$ | 15.3517 g | F.W. 290.81 | Aldrich Chem. |
| $Mn(NO_3)_2$ | $6H_2O$ | 15.4598 g | F.W. 287.04 | Aldrich Chem. |

2. 100 g of $\gamma$-alumina ($\gamma$—$Al_2O_3$) were added to the nitrate solution in a vessel. The $\gamma$-aluminum oxide substrate [$\gamma$-$Al_2O_3$] was obtained from A. Johnson Matthey Company, Word Hill, MA, FW 1001.96; 96+% including 3% C. They were in the form of approximately 3.2 mm tablets with a surface area of 175 $m^2$/g and a density of 3.5–3.9.

The mixture was then stirred in a crucible placed on a heating pad until the mixture was dry. This step removed water and decomposed the nitrates.

3. The solid mixture of step 2 was heated in a Muffle oven at 200° C. for 0.5 hour and then at 450° C. for 1 hour to further decompose the nitrate components. The Muffle oven was then turned off and allowed to equilibrate to room temperature. The solid mixtures were then removed.

4. 4.6601 g of $(NH_4)_6Mo_7O_{24}$, $4H_2O$ (F.W. 1235.86 from Aldrich Chemical) was dissolved in 100 ml of a 10% aqueous ammonium hydroxide solution, i.e. containing 10 ml of $NH_4OH$.

5. The solutions produced in step 4 were then added to the solids mixtures produced in step 3. This mixtures was then gently stirred while heating in a crucible on a heating pad set for 200° C., to dryness and to remove ammonia.

6. The solid mixture produced in step 5 were then calcined in a Muffle oven in a stepwise manner at 250° C. for 0.5 hours, 450° C. for 0.5 hours, and 600° C. for 4 hours. The oven was then switched off and allowed to equilibrate to ambient temperature. The solid mixture was then removed.

7. The solid mixture of step 6 was sulfided with 20–30% $H_2S$ (the balance $N_2$) at a space velocity of 1,000 ml/gh at 600° C. The sulfidation is completed when the outlet $H_2S$ concentration reaches the inlet $H_2S$ concentration

EXAMPLE 2

SULFIDATION BY SOLUTION $Fe_4Co_2Ni_2Mn_2Mo_1S_{17.67}/\gamma$—$Al_2O_3$

1&2. In these steps, metal nitrates in solution were used to impregnate an alumina substrate as described in Example 1.

3. 172.2 mol of 20% $(NH_4)_2S$ solution at 30% excess, (F.W. 68.06, 20–24% in water from Johnson Mathey) was added to a solid mixture made in steps 1 and 2. The resulting solution was heated to dryness in a crucible placed on a heating pad set to 100° C.

4. 4.6601 g of $(NH_4)_6Mo_7O_{24}$ $4H_2O$ was dissolved in 100 ml of a 10% aqueous ammonium hydroxide solution, that is containing 10 ml of $NH_4OH$ and 90 ml water.

5. The solid mixtures of step 3 were then added into the solution of step 4. This mixtures was gently stirred in a crucible placed on a heating pad at 100°C. until it was dry.

6. The solid mixture produced in step 5 was added to a solution of 35 ml aqueous $(NH_4)_2S$ (20% concentration) and 65 ml of water. Then, the solution was heated to dryness in a crucible placed on a heating pad set to 100° C.

7. The solid mixtures produced in step 6 were activated in a quartz reactor under nitrogen gas in a stepwise manner at 250° C. for 0.5 hours, 450° C. for 0.5 hours and 600° C. for 4 hours. The power for heating the quartz reactor was then turned off, and the temperature allowed to equilibrate to ambient temperatures. The final catalyst was then removed.

What is claimed is:

1. A sulfide catalyst for the conversion of sulfur dioxide to elemental sulfur comprising a catalyst selected from the group consisting of $Fe_4Co_2Ni_2Mo_1Mn_4O_{17.66-y}S_y$, $Fe_4Co_1Ni_1Mo_1Mn_4O_{15.33-y}S_y$, $Fe_4Co_1Ni_1Mo_1Cr_2Mn_2O_{17.55-y}S_y$, $Fe_4Co_2Ni_2Mo_1Mn_2S_{17.66}$, $Fe_4Co_1Ni_1Mn_1Cu_2V_8O_{32.33-y}S_y$, $Fe_4Co_1Ni_1Mo_1Pr_6Mn_2O_{26.33-y}S_y$, $Fe_4Co_1Ni_1Mo_1La_6Mn_2O_{26.33-y}S_y$, $Fe_4Co_1Ni_1Mo_1Ce_6Mn_2O_{26.33-y}S_y$, $Fe_4Co_1Ni_1Mo_1Nd_6Mn_2O_{26.33-y}S_y$, $Fe_4Co_1Ni_1Mn_1Cu_5Pr_5O_{24.5-y}S_y$, $Fe_1Co_1Ni_1Bi_5Cu_5O_{16.33-y}S_y$, $Fe_1Co_1Ni_1Zn_5Cu_5O_{16.33-y}S_y$, $Fe_1Co_1Ni_1Mg_5Cu_5O_{16.33-y}S_y$, $Fe_1Co_1Ni_1Ca_5Cu_5O_{16.33-y}S_y$, $Fe_1Co_1Ni_1Se_5Cu_5O_{16.33-y}S_y$, $Fe_2Mg_1Li_1Pr_2Cu_2Bi_2O_{12.67-y}S_y$, $Fe_4Co_1Ni_1Mn_1Cu_2Li_8O_{15.33-y}S_y$, $Fe_2Mg_1Na_1Pr_2Cu_2Bi_2O_{12.67-y}S_y$, and $Fe_4Co_1Ni_1Mn_1Cu_2Na_8O_{15.33-y}S_y$.

2. A method for the conversion of sulfur dioxide to elemental sulfur comprising contacting a mixture of sulfur dioxide and a reducing gas with a catalyst comprising:

A. Fe, Co or Ni sulfides, either singly or in combination,

B. Mo, Mn, Cu, W, V or Cr sulfides, either singly or in combination, and

C. a carrier, the composition of said catalyst being represented by the formula:

$$Fe_aCo_bNi_cCr_dMn_eMo_fV_gCu_hW_iO_xS_y$$

wherein a, b, c, d, e and f are independently ranged between 0 and 30, g and h are between 0 and 10, i is between 0 and 5, wherein at least one of a, b, c≠0 and at least one of d, e, f, g, h, i≠0, and x+y is determined by the charge balance of the catalyst, and the proportion of x:y at the active surface of the catalyst is between about 0:1 and 1:0.1.

3. The method of claim 2, wherein the proportion of x:y is in the range of about 0:1 to 1:0.5.

4. The method of claim 3, wherein the proportion of x:y is in the range of about 0:1 to 1:1.

5. The method of claim 2, wherein the formulation of the catalyst is selected from the group consisting of $Fe_4Co_2Ni_2Mo_1Mn_4O_{17.66-y}S_y$, $Fe_4Co_1Ni_1Mo_1Mn_4O_{15.33-y}S_y$, $Fe_4Co_1Ni_1Mo_1Cr_2Mn_2O_{17.55-y}S_y$, $Fe_4Co_2Ni_2Mo_1Mn_2S_{17.66}$, an $Fe_4Co_1Ni_1Mn_1Cu_2V_8O_{32.33-y}S_y$.

6. The method of claim 2, additionally comprising a rare earth metal sulfide.

7. The method of claim 6, wherein the rare earth metal sulfide La, Ce, Pr, and Nd is selected from the group consisting of sulfides.

8. The method of claim 7, wherein the formulation of the catalyst is selected from the group consisting of $Fe_4Co_1Ni_1Mo_1Pr_6Mn_2O_{26.33-y}S_y$, $Fe_4Co_1Ni_1Mo_1La_6Mn_2O_{26.33-y}S_y$, $Fe_4Co_1Ni_1Mo_1Ce_6Mn_2O_{26.33-y}S_y$, $Fe_4Co_1Ni_1Mo_1Nd6Mn_2O_{26.33-y}S_y$, and $Fe_4Co_1Ni_1Mn_1Cu_5Pr_5O_{24.5-y}S_y$.

9. The method of claim 2, additionally comprising an active metal sulfide.

10. The method of claim 9, wherein said active metal sulfide is selected from the group consisting of Zn, Mg, Ca, Se, Bi, Li, Na, K, and Cs sulfides.

11. The method of claim 10, wherein the formulation of the catalyst is selected from the group consisting of $Fe_1Co_1Ni_1Bi_5Cu_5O_{16.33-y}S_y$, $Fe_1Co_1Ni_1Zn_5Cu_5O_{16.33-y}S_y$, $Fe_1Co_1Ni_1Mg_5Cu_5O_{16.33-y}S_y$, $Fe_1Co_1Ni_1Ca_5Cu_5O_{16.33-y}S_y$, $Fe_1Co_1Ni_1Se_5Cu_5O_{16.33-y}S_y$, $Fe_2Mg_1Li_1Pr_2Cu_2Bi_2O_{12.67-y}S_y$, $Fe_4Co_1Ni_1Mn_1Cu_2Li_8O_{15.33-y}S_y$, $Fe_2Mg_1Na_1Pr_2Cu_2Bi_2O_{12.67-y}S_y$, and $Fe_4Co_1Ni_1Mn_1Cu_2Na_8O_{15.33-y}S_y$.

12. A method for the conversion of sulfur dioxide to elemental sulfur which has a high conversion rate in the presence of low levels or in the absence of $H_2O$ and $H_2$, comprising contacting a mixture of sulfur dioxide and a reducing gas with a catalyst comprising:

A. a component selected from Li, Na, K, Cs, La, Ce, Pr, sulfides, or mixtures thereof, and B. a carrier, the composition of said catalyst being represented by the formula:

$$A_aR_bO_xS_y$$

where A is an alkali metal selected from the group consisting of Li, Na, K, and Cs, R is a rare earth metal selected from the group consisting of La, Ce, and Pr, a and b are independently ranged between 0 and 30, and at least one of a, b≠0, x+y is determined by the charge balance of the catalyst, and the proportion of x:y is between about 0:1 and 1:0.1, wherein the formulation is selected from the group consisting of $Li_2O_{1-y}S_y$, $Na_2O_{1-y}S_y$, $K_2O_{1-y}S_y$, $Cs_2O_{1-y}S_y$, $Pr_6O_{11-y}S_y$, $Ce_6O_{11-y}S_y$, and $La_6O_{11-y}S_y$.

* * * * *